US011675746B2

(12) United States Patent
Thummala et al.

(10) Patent No.: US 11,675,746 B2
(45) Date of Patent: Jun. 13, 2023

(54) VIRTUALIZED SERVER SYSTEMS AND METHODS INCLUDING DOMAIN JOINING TECHNIQUES

(71) Applicant: Nutanix, Inc., San Jose, CA (US)

(72) Inventors: Hemantha Kumar Thummala, San Jose, CA (US); Krishna Shibu Pillai, Bangalore (IN); Manish Gupta, Bangalore (IN); Shyamsunder Prayagchand Rathi, Sunnyvale, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/364,453

(22) Filed: Jun. 30, 2021

(65) Prior Publication Data

US 2021/0397587 A1 Dec. 23, 2021

Related U.S. Application Data

(62) Division of application No. 15/966,943, filed on Apr. 30, 2018, now Pat. No. 11,086,826.

(51) Int. Cl.
*G06F 16/182* (2019.01)
*H04L 9/40* (2022.01)
*G06F 9/455* (2018.01)

(52) U.S. Cl.
CPC ........ *G06F 16/182* (2019.01); *G06F 9/45558* (2013.01); *H04L 63/08* (2013.01); *G06F 2009/45579* (2013.01); *G06F 2009/45583* (2013.01)

(58) Field of Classification Search
CPC ....... G06F 9/45558; G06F 2009/45579; G06F 2009/45583; G06F 16/182; H04L 63/08
See application file for complete search history.

(56) References Cited

U.S. PATENT DOCUMENTS

| 5,276,867 A | 1/1994 | Kenley et al. |
| 5,664,144 A | 9/1997 | Yanai et al. |
| 5,870,555 A | 2/1999 | Pruett et al. |

(Continued)

FOREIGN PATENT DOCUMENTS

| CN | 103746997 A | 4/2014 |
| CN | 110519112 A | 11/2019 |

(Continued)

OTHER PUBLICATIONS

US 11,048,595 B2, 06/2021, Venkatesh et al. (withdrawn)

(Continued)

*Primary Examiner* — Chau Le
(74) *Attorney, Agent, or Firm* — Stoel Rives LLP

(57) ABSTRACT

Examples described herein include virtualized environments including a virtualized file server. Examples of secure domain join processes are described which may facilitate joining a virtualized file server or portions thereof to a domain. In some examples, the secure domain join process itself, and/or an associated file server virtual machine, may have insufficient credentials to write objects into an active directory. The active directory credentials need not be shared with the file server virtual machine. Rather, in some (Continued)

examples, the secure domain join process may provide a user system with a list of actions to be performed using active directory credentials.

22 Claims, 13 Drawing Sheets

(56) References Cited

U.S. PATENT DOCUMENTS

| | | | |
|---|---|---|---|
| 5,873,085 A | 2/1999 | Enoki et al. |
| 6,055,543 A | 4/2000 | Christensen et al. |
| 6,085,234 A | 7/2000 | Pitts et al. |
| 6,101,508 A | 8/2000 | Wolff |
| 6,212,531 B1 | 4/2001 | Blea et al. |
| 6,289,356 B1 | 9/2001 | Hitz et al. |
| 6,341,340 B1 | 1/2002 | Tsukerman et al. |
| 6,442,602 B1 | 8/2002 | Choudhry |
| 6,963,914 B1 | 11/2005 | Breitbart et al. |
| 6,968,345 B1 | 11/2005 | Muhlestein |
| 7,120,631 B1 | 10/2006 | Vahalia et al. |
| 7,356,679 B1 | 4/2008 | Le et al. |
| 7,409,511 B2 | 8/2008 | Edwards et al. |
| 7,606,868 B1 | 10/2009 | Le et al. |
| 7,702,843 B1 | 4/2010 | Chen et al. |
| 7,707,618 B1 | 4/2010 | Cox et al. |
| 7,725,671 B2 | 5/2010 | Prahlad et al. |
| 7,752,492 B1 | 7/2010 | Armangau et al. |
| 7,774,391 B1 | 8/2010 | Le et al. |
| 7,805,469 B1 | 9/2010 | Nagaralu et al. |
| 7,805,511 B1 | 9/2010 | Panicker et al. |
| 7,840,533 B2 | 11/2010 | Prahlad et al. |
| 7,890,529 B1 | 2/2011 | Srinivasan et al. |
| 7,937,453 B1 | 5/2011 | Hayden et al. |
| 8,095,810 B2 | 1/2012 | Matsuzawa et al. |
| 8,095,931 B1 | 1/2012 | Chen et al. |
| 8,352,482 B2 | 1/2013 | Hansen |
| 8,352,608 B1 | 1/2013 | Keagy et al. |
| 8,359,594 B1 | 1/2013 | Davidson et al. |
| 8,365,167 B2 | 1/2013 | Beaty |
| 8,407,448 B1 | 3/2013 | Hayden et al. |
| 8,447,728 B2 | 5/2013 | Prahlad et al. |
| 8,473,462 B1 | 6/2013 | Banerjee |
| 8,484,163 B1 | 7/2013 | Yucel et al. |
| 8,484,356 B1 | 7/2013 | Douglis et al. |
| 8,539,076 B2 | 9/2013 | Nakano et al. |
| 8,543,790 B2 | 9/2013 | Chen et al. |
| 8,549,518 B1 | 10/2013 | Aron et al. |
| 8,601,473 B1 | 12/2013 | Aron et al. |
| 8,635,351 B2 | 1/2014 | Astete et al. |
| 8,646,089 B2 | 2/2014 | Jayanthi et al. |
| 8,688,660 B1 | 4/2014 | Sivasubramanian et al. |
| 8,751,515 B1 | 6/2014 | Xing et al. |
| 8,762,335 B2 | 6/2014 | Prahlad et al. |
| 8,805,951 B1 | 8/2014 | Faibish et al. |
| 8,838,923 B2 | 9/2014 | Prahlad et al. |
| 8,850,130 B1 | 9/2014 | Aron et al. |
| 8,863,124 B1 | 10/2014 | Aron |
| 8,914,429 B2 | 12/2014 | Pitts |
| 8,935,563 B1 | 1/2015 | Rajaa et al. |
| 8,949,557 B2 | 2/2015 | Kamei et al. |
| 8,966,188 B1 | 2/2015 | Bardale |
| 8,983,952 B1 | 3/2015 | Zhang et al. |
| 8,996,783 B2 | 3/2015 | Huang et al. |
| 9,009,106 B1 | 4/2015 | Aron et al. |
| 9,043,567 B1 | 5/2015 | Modukuri et al. |
| 9,060,014 B2 | 6/2015 | Crowley |
| 9,069,708 B2 | 6/2015 | Gill et al. |
| 9,152,628 B1 | 10/2015 | Stacey et al. |
| 9,154,535 B1 | 10/2015 | Harris |
| 9,165,003 B1 | 10/2015 | Tummala et al. |
| 9,201,698 B2 | 12/2015 | Ashok et al. |
| 9,201,704 B2 | 12/2015 | Chang et al. |
| 9,201,887 B1 | 12/2015 | Earl et al. |
| 9,213,513 B2 | 12/2015 | Hartz et al. |
| 9,244,674 B2 | 1/2016 | Waterman et al. |
| 9,244,969 B1 | 1/2016 | Love et al. |
| 9,256,475 B1 | 2/2016 | Aron et al. |
| 9,256,612 B1 | 2/2016 | Bhatt et al. |
| 9,268,586 B2 | 2/2016 | Voccio et al. |
| 9,274,817 B1 | 3/2016 | Fan et al. |
| 9,286,298 B1 | 3/2016 | Gillett, Jr. |
| 9,292,327 B1 | 3/2016 | Von Thenen et al. |
| 9,336,132 B1 | 5/2016 | Aron et al. |
| 9,348,702 B2 | 5/2016 | Hsu et al. |
| 9,405,482 B2 | 8/2016 | Varadharajan et al. |
| 9,405,566 B2 | 8/2016 | Chawla et al. |
| 9,411,628 B2 | 8/2016 | Bezbaruah et al. |
| 9,430,646 B1 | 8/2016 | Mushtaq et al. |
| 9,448,887 B1 | 9/2016 | Ben Dayan et al. |
| 9,497,257 B1 | 11/2016 | Love et al. |
| 9,513,946 B2 | 12/2016 | Sevigny et al. |
| 9,519,596 B2 | 12/2016 | Coppola et al. |
| 9,535,907 B1 | 1/2017 | Stringham |
| 9,563,555 B2 | 2/2017 | Flynn et al. |
| 9,571,561 B2 | 2/2017 | Jang |
| 9,619,257 B1 | 4/2017 | Aron et al. |
| 9,634,990 B2 | 4/2017 | Lee |
| 9,639,428 B1 | 5/2017 | Boda |
| 9,652,265 B1 | 5/2017 | Narayanasamy et al. |
| 9,690,670 B1 | 6/2017 | Paulzagade et al. |
| 9,733,958 B2 | 8/2017 | Cui et al. |
| 9,740,436 B2 | 8/2017 | Fiebrich-kandler et al. |
| 9,740,472 B1 | 8/2017 | Sohi et al. |
| 9,740,723 B2 | 8/2017 | Prahlad et al. |
| 9,747,287 B1 | 8/2017 | Bhardwaj et al. |
| 9,772,866 B1 | 9/2017 | Aron et al. |
| 9,832,136 B1 | 11/2017 | Gibson |
| 9,846,706 B1 | 12/2017 | Basov et al. |
| 9,853,978 B2 | 12/2017 | Tellvik et al. |
| 9,870,291 B2 | 1/2018 | Bezbaruah et al. |
| 9,893,988 B2 | 2/2018 | Agarwal et al. |
| 9,940,154 B2 | 4/2018 | Ramani et al. |
| 9,946,573 B2 | 4/2018 | Mcdermott |
| 10,009,215 B1 | 6/2018 | Shorey |
| 10,050,862 B2 | 8/2018 | Nambiar et al. |
| 10,083,022 B2 | 9/2018 | Fukui et al. |
| 10,084,873 B2 | 9/2018 | Dornemann |
| 10,095,506 B2 | 10/2018 | Gopalapura Venkatesh et al. |
| 10,101,989 B2 | 10/2018 | Sinha et al. |
| 10,114,706 B1 | 10/2018 | Chougala et al. |
| 10,127,059 B2 | 11/2018 | Astete et al. |
| 10,140,115 B2 | 11/2018 | Fukui et al. |
| 10,152,233 B2 | 12/2018 | Xu et al. |
| 10,210,048 B2 | 2/2019 | Sancheti |
| 10,248,657 B2 | 4/2019 | Prahlad et al. |
| 10,367,753 B2 | 7/2019 | Schultze et al. |
| 10,394,547 B2 | 8/2019 | Fukui et al. |
| 10,409,653 B2 | 9/2019 | Von Muhlen et al. |
| 10,419,426 B2 * | 9/2019 | Bakshan .............. H04L 63/20 |
| 10,452,456 B2 | 10/2019 | Von Muhlen et al. |
| 10,496,321 B2 | 12/2019 | Varadharajan et al. |
| 10,523,592 B2 | 12/2019 | Byers et al. |
| 10,530,742 B2 | 1/2020 | Shah et al. |
| 10,540,164 B2 | 1/2020 | Bafna et al. |
| 10,540,165 B2 | 1/2020 | Bafna et al. |
| 10,540,166 B2 | 1/2020 | Arikatla et al. |
| 10,572,317 B2 | 2/2020 | Von Muhlen et al. |
| 10,579,443 B2 | 3/2020 | Von Muhlen et al. |
| 10,678,651 B1 | 6/2020 | Borodin et al. |
| 10,705,889 B2 | 7/2020 | Von Muhlen et al. |
| 10,719,305 B2 | 7/2020 | Sinha et al. |
| 10,719,306 B2 | 7/2020 | Deshmukh et al. |
| 10,719,307 B2 | 7/2020 | Kanada et al. |
| 10,728,090 B2 | 7/2020 | Deshmukh et al. |
| 10,809,998 B2 | 10/2020 | Gopalapura Venkatesh et al. |
| 10,824,455 B2 | 11/2020 | Arikatla et al. |
| 10,831,465 B2 | 11/2020 | Sharpe et al. |
| 10,838,708 B2 | 11/2020 | Sinha et al. |
| 10,949,192 B2 | 3/2021 | Gopalapura Venkatesh et al. |
| 11,025,626 B1 | 6/2021 | Todd et al. |
| 11,086,826 B2 | 8/2021 | Thummala et al. |
| 11,106,447 B2 | 8/2021 | Gupta et al. |
| 11,204,710 B2 | 12/2021 | Varadharajan et al. |
| 11,281,484 B2 | 3/2022 | Bafna et al. |

(56) References Cited

U.S. PATENT DOCUMENTS

| | | |
|---|---|---|
| 11,288,239 B2 | 3/2022 | Bafna |
| 11,294,777 B2 | 4/2022 | Venkatesh et al. |
| 2001/0047400 A1 | 11/2001 | Coates et al. |
| 2002/0069196 A1 | 6/2002 | Betros et al. |
| 2002/0120763 A1 | 8/2002 | Miloushev et al. |
| 2003/0115218 A1 | 6/2003 | Bobbitt et al. |
| 2003/0163597 A1 | 8/2003 | Hellman et al. |
| 2003/0195942 A1 | 10/2003 | Muhlestein et al. |
| 2004/0054777 A1 | 3/2004 | Ackaouy et al. |
| 2004/0210591 A1 | 10/2004 | Hirschfeld et al. |
| 2004/0267832 A1 | 12/2004 | Wong et al. |
| 2005/0120160 A1 | 6/2005 | Plouffe et al. |
| 2005/0120180 A1 | 6/2005 | Schornbach et al. |
| 2005/0125503 A1 | 6/2005 | Iyengar et al. |
| 2005/0193221 A1 | 9/2005 | Yoneyama |
| 2005/0193245 A1 | 9/2005 | Hayden et al. |
| 2005/0226059 A1 | 10/2005 | Kavuri et al. |
| 2005/0228798 A1 | 10/2005 | Shepard et al. |
| 2006/0010227 A1 | 1/2006 | Atluri |
| 2006/0047685 A1 | 3/2006 | Dearing et al. |
| 2006/0080445 A1* | 4/2006 | Chang ............... G06F 21/31 709/227 |
| 2006/0206901 A1 | 9/2006 | Chan |
| 2006/0224918 A1 | 10/2006 | Koike |
| 2006/0225065 A1 | 10/2006 | Chandhok et al. |
| 2006/0271931 A1 | 11/2006 | Harris et al. |
| 2007/0022129 A1 | 1/2007 | Bahar et al. |
| 2007/0038913 A1 | 2/2007 | Allen et al. |
| 2007/0100905 A1 | 5/2007 | Masters et al. |
| 2007/0171921 A1 | 7/2007 | Wookey et al. |
| 2007/0300220 A1* | 12/2007 | Seliger ............... H04L 63/0272 718/1 |
| 2008/0040483 A1 | 2/2008 | Nakatani et al. |
| 2008/0071804 A1 | 3/2008 | Gunda |
| 2008/0098194 A1 | 4/2008 | Hashimoto et al. |
| 2008/0104349 A1 | 5/2008 | Maruyama |
| 2008/0104589 A1 | 5/2008 | Mccrory et al. |
| 2008/0133486 A1 | 6/2008 | Fitzgerald et al. |
| 2008/0134178 A1 | 6/2008 | Fitzgerald et al. |
| 2008/0189468 A1 | 8/2008 | Schmidt et al. |
| 2008/0195827 A1 | 8/2008 | Saika |
| 2008/0201414 A1 | 8/2008 | Amir et al. |
| 2008/0201457 A1 | 8/2008 | London |
| 2008/0263113 A1 | 10/2008 | Krishnaiyer et al. |
| 2008/0270677 A1 | 10/2008 | Kolakowski |
| 2008/0320499 A1 | 12/2008 | Suit |
| 2008/0320583 A1 | 12/2008 | Sharma et al. |
| 2009/0006801 A1 | 1/2009 | Shultz et al. |
| 2009/0100248 A1 | 4/2009 | Kami |
| 2009/0150885 A1 | 6/2009 | Safari et al. |
| 2009/0158082 A1 | 6/2009 | Jain et al. |
| 2009/0171971 A1 | 7/2009 | Goddard et al. |
| 2009/0182860 A1 | 7/2009 | Hwang et al. |
| 2009/0193272 A1 | 7/2009 | Matsuzawa et al. |
| 2009/0216975 A1 | 8/2009 | Halperin et al. |
| 2009/0248870 A1 | 10/2009 | Kamei et al. |
| 2009/0249470 A1 | 10/2009 | Litvin et al. |
| 2009/0271412 A1 | 10/2009 | Lacapra et al. |
| 2009/0287887 A1 | 11/2009 | Matsuki et al. |
| 2009/0288084 A1 | 11/2009 | Astete et al. |
| 2010/0070725 A1 | 3/2010 | Prahlad et al. |
| 2010/0082716 A1 | 4/2010 | Agetsuma et al. |
| 2010/0082774 A1 | 4/2010 | Pitts |
| 2010/0095289 A1 | 4/2010 | Nguyen et al. |
| 2010/0138921 A1 | 6/2010 | Na et al. |
| 2010/0174745 A1 | 7/2010 | Ryan et al. |
| 2010/0214908 A1 | 8/2010 | Ralev |
| 2010/0241785 A1 | 9/2010 | Chen et al. |
| 2010/0250824 A1 | 9/2010 | Belay |
| 2010/0275205 A1 | 10/2010 | Nakajima |
| 2010/0306256 A1 | 12/2010 | Blackman |
| 2011/0022694 A1 | 1/2011 | Dalal et al. |
| 2011/0022695 A1 | 1/2011 | Dalal et al. |
| 2011/0022812 A1 | 1/2011 | Van et al. |
| 2011/0022883 A1 | 1/2011 | Hansen |
| 2011/0047340 A1 | 2/2011 | Olson et al. |
| 2011/0078318 A1 | 3/2011 | Desai et al. |
| 2011/0119668 A1 | 5/2011 | Calder et al. |
| 2011/0119763 A1 | 5/2011 | Wade et al. |
| 2011/0125835 A1 | 5/2011 | Soltis |
| 2011/0153561 A1 | 6/2011 | Sawdon et al. |
| 2011/0161299 A1 | 6/2011 | Prahlad et al. |
| 2011/0179414 A1 | 7/2011 | Goggin et al. |
| 2011/0184993 A1 | 7/2011 | Chawla et al. |
| 2011/0185292 A1 | 7/2011 | Chawla et al. |
| 2011/0225574 A1 | 9/2011 | Khalidi et al. |
| 2011/0239213 A1 | 9/2011 | Aswani et al. |
| 2011/0251992 A1 | 10/2011 | Bethlehem et al. |
| 2011/0252208 A1 | 10/2011 | Ali et al. |
| 2011/0255538 A1 | 10/2011 | Srinivasan et al. |
| 2011/0265076 A1 | 10/2011 | Thorat et al. |
| 2011/0271279 A1 | 11/2011 | Pate |
| 2011/0276578 A1 | 11/2011 | Allalouf et al. |
| 2011/0276963 A1 | 11/2011 | Wu et al. |
| 2011/0283277 A1 | 11/2011 | Castillo et al. |
| 2011/0289561 A1 | 11/2011 | Ivanov et al. |
| 2011/0307729 A1 | 12/2011 | Matsuzawa et al. |
| 2011/0320690 A1 | 12/2011 | Petersen et al. |
| 2012/0017114 A1 | 1/2012 | Timashev et al. |
| 2012/0023495 A1 | 1/2012 | Machida |
| 2012/0030456 A1 | 2/2012 | Wu et al. |
| 2012/0054736 A1 | 3/2012 | Arcese et al. |
| 2012/0081395 A1 | 4/2012 | Adi et al. |
| 2012/0084381 A1 | 4/2012 | Alladi et al. |
| 2012/0166866 A1 | 6/2012 | Rao |
| 2012/0209983 A1 | 8/2012 | Bronner et al. |
| 2012/0233463 A1 | 9/2012 | Holt et al. |
| 2012/0254445 A1 | 10/2012 | Kawamoto et al. |
| 2012/0254567 A1 | 10/2012 | Umbehocker |
| 2012/0266162 A1 | 10/2012 | Baron |
| 2012/0272237 A1 | 10/2012 | Baron |
| 2012/0290630 A1 | 11/2012 | Aizman et al. |
| 2012/0310892 A1 | 12/2012 | Dam et al. |
| 2012/0324183 A1 | 12/2012 | Chiruvolu et al. |
| 2012/0331119 A1 | 12/2012 | Bose et al. |
| 2013/0046740 A1 | 2/2013 | Li et al. |
| 2013/0047160 A1 | 2/2013 | Conover |
| 2013/0055018 A1 | 2/2013 | Joshi et al. |
| 2013/0061110 A1 | 3/2013 | Zvibel |
| 2013/0061167 A1 | 3/2013 | Rhodes et al. |
| 2013/0066930 A1 | 3/2013 | Kamei et al. |
| 2013/0117744 A1 | 5/2013 | Klein et al. |
| 2013/0132674 A1 | 5/2013 | Sundrani |
| 2013/0151888 A1 | 6/2013 | Bhattiprolu et al. |
| 2013/0152085 A1 | 6/2013 | Amore et al. |
| 2013/0185716 A1 | 7/2013 | Yin et al. |
| 2013/0198738 A1 | 8/2013 | Reddin et al. |
| 2013/0212345 A1 | 8/2013 | Nakajima |
| 2013/0227379 A1 | 8/2013 | Gupta et al. |
| 2013/0227552 A1 | 8/2013 | Reddin et al. |
| 2013/0227566 A1 | 8/2013 | Higuchi et al. |
| 2013/0232491 A1 | 9/2013 | Radhakrishnan et al. |
| 2013/0246705 A1 | 9/2013 | Diare |
| 2013/0247036 A1 | 9/2013 | Fujiwara |
| 2013/0262396 A1 | 10/2013 | Kripalani et al. |
| 2013/0283267 A1 | 10/2013 | Cooper et al. |
| 2013/0297869 A1 | 11/2013 | Mills et al. |
| 2014/0006708 A1 | 1/2014 | Huynh et al. |
| 2014/0025796 A1 | 1/2014 | Vibhor et al. |
| 2014/0059392 A1 | 2/2014 | Ren et al. |
| 2014/0075029 A1 | 3/2014 | Lipchuk et al. |
| 2014/0095544 A1 | 4/2014 | Eshel et al. |
| 2014/0095555 A1 | 4/2014 | Kim et al. |
| 2014/0095816 A1 | 4/2014 | Hsu et al. |
| 2014/0108587 A1 | 4/2014 | Goldberg et al. |
| 2014/0115182 A1 | 4/2014 | Sabaa et al. |
| 2014/0123138 A1 | 5/2014 | Lee et al. |
| 2014/0146055 A1 | 5/2014 | Bala et al. |
| 2014/0149794 A1 | 5/2014 | Shetty et al. |
| 2014/0149983 A1 | 5/2014 | Bonilla et al. |
| 2014/0173199 A1 | 6/2014 | Gupta et al. |
| 2014/0181048 A1 | 6/2014 | Varadharajan et al. |
| 2014/0181116 A1 | 6/2014 | Wang |
| 2014/0181438 A1 | 6/2014 | Varadharajan et al. |

(56) References Cited

U.S. PATENT DOCUMENTS

| | | |
|---|---|---|
| 2014/0188808 A1 | 7/2014 | Wolf et al. |
| 2014/0189429 A1 | 7/2014 | Gill et al. |
| 2014/0189677 A1 | 7/2014 | Curzi |
| 2014/0189685 A1 | 7/2014 | Kripalani |
| 2014/0189686 A1 | 7/2014 | Masters et al. |
| 2014/0196038 A1 | 7/2014 | Kottomtharayil et al. |
| 2014/0201725 A1 | 7/2014 | Tian et al. |
| 2014/0207824 A1 | 7/2014 | Brandwine et al. |
| 2014/0230024 A1 | 8/2014 | Uehara et al. |
| 2014/0237464 A1 | 8/2014 | Waterman et al. |
| 2014/0250300 A1 | 9/2014 | Runkis et al. |
| 2014/0279909 A1 | 9/2014 | Sudarsanam et al. |
| 2014/0298185 A1 | 10/2014 | Chen et al. |
| 2014/0310710 A1 | 10/2014 | Lubsey et al. |
| 2014/0359612 A1 | 12/2014 | D'Amato et al. |
| 2015/0006788 A1 | 1/2015 | Liu et al. |
| 2015/0007180 A1 | 1/2015 | Sharp et al. |
| 2015/0026682 A1 | 1/2015 | Singh et al. |
| 2015/0032690 A1 | 1/2015 | Hoque et al. |
| 2015/0039735 A1 | 2/2015 | Zeyliger et al. |
| 2015/0039837 A1 | 2/2015 | Quan et al. |
| 2015/0058475 A1 | 2/2015 | Earl et al. |
| 2015/0074659 A1 | 3/2015 | Madsen et al. |
| 2015/0081644 A1 | 3/2015 | Pitts |
| 2015/0095788 A1 | 4/2015 | Thiele et al. |
| 2015/0106802 A1 | 4/2015 | Ivanov et al. |
| 2015/0142745 A1 | 5/2015 | Tekade et al. |
| 2015/0142747 A1 | 5/2015 | Zou |
| 2015/0143164 A1 | 5/2015 | Veerla et al. |
| 2015/0172412 A1 | 6/2015 | Escriva et al. |
| 2015/0178019 A1 | 6/2015 | Hegdal et al. |
| 2015/0205639 A1 | 7/2015 | Matsumoto et al. |
| 2015/0213032 A1 | 7/2015 | Powell et al. |
| 2015/0220324 A1 | 8/2015 | Arcese et al. |
| 2015/0242291 A1 | 8/2015 | Chang et al. |
| 2015/0248402 A1 | 9/2015 | Patterson, III et al. |
| 2015/0278046 A1 | 10/2015 | Zellermayer et al. |
| 2015/0293830 A1 | 10/2015 | Bhide et al. |
| 2015/0293896 A1 | 10/2015 | Runkis et al. |
| 2015/0301903 A1 | 10/2015 | Mutha et al. |
| 2015/0032653 A1 | 11/2015 | Cui et al. |
| 2015/0324217 A1 | 11/2015 | Shilmover et al. |
| 2015/0326531 A1 | 11/2015 | Cui et al. |
| 2015/0331757 A1 | 11/2015 | Durge et al. |
| 2015/0355862 A1 | 12/2015 | Hayes et al. |
| 2015/0378761 A1 | 12/2015 | Sevigny et al. |
| 2015/0378853 A1 | 12/2015 | Sevigny et al. |
| 2016/0011898 A1 | 1/2016 | Lee et al. |
| 2016/0070492 A1 | 3/2016 | Cherubini et al. |
| 2016/0077988 A1 | 3/2016 | Tipton |
| 2016/0078068 A1 | 3/2016 | Agrawal et al. |
| 2016/0085480 A1 | 3/2016 | Chiu et al. |
| 2016/0085574 A1 | 3/2016 | Dornemann et al. |
| 2016/0087861 A1 | 3/2016 | Kuan et al. |
| 2016/0110214 A1 | 4/2016 | Vincent et al. |
| 2016/0110267 A1 | 4/2016 | Earl et al. |
| 2016/0124665 A1 | 5/2016 | Jain et al. |
| 2016/0162371 A1 | 6/2016 | Prabhu et al. |
| 2016/0171241 A1 | 6/2016 | Yun |
| 2016/0179419 A1 | 6/2016 | Yamaguchi et al. |
| 2016/0180107 A1 | 6/2016 | Panchbudhe et al. |
| 2016/0188232 A1 | 6/2016 | Ramachandran et al. |
| 2016/0188407 A1 | 6/2016 | Bronnikov et al. |
| 2016/0202916 A1 | 7/2016 | Cui et al. |
| 2016/0203008 A1 | 7/2016 | Cui et al. |
| 2016/0216993 A1 | 7/2016 | Beckwith et al. |
| 2016/0224363 A1 | 8/2016 | Joy |
| 2016/0274926 A1 | 9/2016 | Narasimhamurthy et al. |
| 2016/0301766 A1 | 10/2016 | Ionescu et al. |
| 2016/0306558 A1 | 10/2016 | Varadharajan et al. |
| 2016/0306751 A1 | 10/2016 | Amarendran et al. |
| 2016/0316003 A1 | 10/2016 | Snider et al. |
| 2016/0328226 A1 | 11/2016 | Arya et al. |
| 2016/0335134 A1 | 11/2016 | Gupta et al. |
| 2016/0359697 A1 | 12/2016 | Scheib et al. |
| 2016/0378528 A1 | 12/2016 | Zamir |
| 2016/0378616 A1 | 12/2016 | Wigmore et al. |
| 2017/0004131 A1 | 1/2017 | Ben Dayan et al. |
| 2017/0005990 A1 | 1/2017 | Birger et al. |
| 2017/0012904 A1 | 1/2017 | Matzek et al. |
| 2017/0024152 A1 | 1/2017 | Bhagi et al. |
| 2017/0024224 A1 | 1/2017 | Bakke et al. |
| 2017/0039078 A1 | 2/2017 | Chen et al. |
| 2017/0039218 A1 | 2/2017 | Prahlad et al. |
| 2017/0048223 A1 | 2/2017 | Anantha Padmanaban et al. |
| 2017/0068469 A1 | 3/2017 | Shankar et al. |
| 2017/0075921 A1 | 3/2017 | Benton et al. |
| 2017/0090776 A1 | 3/2017 | Kowles |
| 2017/0091047 A1 | 3/2017 | Bangalore et al. |
| 2017/0109184 A1 | 4/2017 | Ramani et al. |
| 2017/0160983 A1 | 6/2017 | Fiske et al. |
| 2017/0177638 A1 | 6/2017 | Bhosale et al. |
| 2017/0193021 A1 | 7/2017 | Deng et al. |
| 2017/0206074 A1 | 7/2017 | Arcese et al. |
| 2017/0206207 A1 | 7/2017 | Bondurant et al. |
| 2017/0220661 A1 | 8/2017 | Cao et al. |
| 2017/0228300 A1 | 8/2017 | Thomas et al. |
| 2017/0235507 A1 | 8/2017 | Sinha et al. |
| 2017/0235562 A1 | 8/2017 | Bafna et al. |
| 2017/0235563 A1 | 8/2017 | Bafna et al. |
| 2017/0235589 A1 | 8/2017 | Gopalapura Venkatesh et al. |
| 2017/0235590 A1 | 8/2017 | Sinha et al. |
| 2017/0235591 A1 | 8/2017 | Kanada et al. |
| 2017/0235653 A1 | 8/2017 | Arikatla et al. |
| 2017/0235654 A1 | 8/2017 | Deshmukh et al. |
| 2017/0235751 A1 | 8/2017 | Gupta et al. |
| 2017/0235758 A1 | 8/2017 | Gopalapura Venkatesh et al. |
| 2017/0235760 A1 | 8/2017 | Sharpe et al. |
| 2017/0235761 A1 | 8/2017 | Bafna et al. |
| 2017/0235762 A1 | 8/2017 | Sharpe et al. |
| 2017/0235763 A1 | 8/2017 | Gopalapura Venkatesh et al. |
| 2017/0235764 A1 | 8/2017 | Sharpe et al. |
| 2017/0235950 A1 | 8/2017 | Gopalapura Venkatesh et al. |
| 2017/0242599 A1 | 8/2017 | Patnaik et al. |
| 2017/0262346 A1 | 9/2017 | Pradhan et al. |
| 2017/0264684 A1 | 9/2017 | Spillane et al. |
| 2017/0277556 A1 | 9/2017 | Ishii et al. |
| 2017/0277903 A1 | 9/2017 | Christodorescu et al. |
| 2017/0279674 A1 | 9/2017 | Zhu |
| 2017/0286228 A1 | 10/2017 | Redko et al. |
| 2017/0302589 A1 | 10/2017 | Leafe et al. |
| 2017/0302731 A1 | 10/2017 | Cui |
| 2018/0004766 A1 | 1/2018 | Darling |
| 2018/0062993 A1 | 3/2018 | Wu et al. |
| 2018/0129426 A1 | 5/2018 | Aron et al. |
| 2018/0143845 A1 | 5/2018 | Chawla et al. |
| 2018/0145960 A1* | 5/2018 | Bakshan ............... G06F 16/128 |
| 2018/0157521 A1 | 6/2018 | Arikatla et al. |
| 2018/0157522 A1 | 6/2018 | Bafna et al. |
| 2018/0157561 A1 | 6/2018 | Venkatesh et al. |
| 2018/0157677 A1 | 6/2018 | Bafna et al. |
| 2018/0157752 A1 | 6/2018 | Arikatla et al. |
| 2018/0157860 A1 | 6/2018 | Nair et al. |
| 2018/0159729 A1 | 6/2018 | Deshmukh et al. |
| 2018/0159826 A1 | 6/2018 | Yisan et al. |
| 2018/0173731 A1 | 6/2018 | Nazari et al. |
| 2018/0181266 A1 | 6/2018 | Von Muhlen et al. |
| 2018/0181448 A1 | 6/2018 | Von Muhlen et al. |
| 2018/0181449 A1 | 6/2018 | Von Muhlen et al. |
| 2018/0181723 A1 | 6/2018 | Von Muhlen et al. |
| 2018/0196719 A1 | 7/2018 | Glass |
| 2018/0205787 A1 | 7/2018 | Ben Dayan et al. |
| 2018/0278602 A1 | 9/2018 | Koushik et al. |
| 2018/0332105 A1 | 11/2018 | Huang et al. |
| 2018/0181587 A1 | 12/2018 | Von Muhlen et al. |
| 2018/0357251 A1 | 12/2018 | Kumarasamy et al. |
| 2019/0026101 A1 | 1/2019 | Venkatesh et al. |
| 2019/0034240 A1 | 1/2019 | Nabi |
| 2019/0079747 A1 | 3/2019 | Sinha et al. |
| 2019/0129808 A1 | 5/2019 | Acharya et al. |
| 2019/0196718 A1 | 6/2019 | Pai et al. |
| 2019/0207925 A1 | 7/2019 | Anantha Padmanaban et al. |
| 2019/0286330 A1 | 9/2019 | Varadharajan et al. |
| 2019/0332683 A1 | 10/2019 | Thummala et al. |

(56) References Cited

U.S. PATENT DOCUMENTS

| | | | |
|---|---|---|---|
| 2019/0339883 | A1 | 11/2019 | Aron et al. |
| 2020/0007530 | A1 | 1/2020 | Mohamad Abdul et al. |
| 2020/0034069 | A1 | 1/2020 | Batra et al. |
| 2020/0036647 | A1 | 1/2020 | Gupta et al. |
| 2020/0081704 | A1 | 3/2020 | Bafna et al. |
| 2020/0081733 | A1 | 3/2020 | Buck et al. |
| 2020/0106669 | A1 | 4/2020 | Dhillon et al. |
| 2020/0125426 | A1 | 4/2020 | Von Muhlen et al. |
| 2020/0137157 | A1 | 4/2020 | Joseph et al. |
| 2020/0274869 | A1* | 8/2020 | Tahenakos .......... H04L 67/1046 |
| 2021/0081358 | A1 | 3/2021 | Khurana et al. |
| 2021/0141630 | A1 | 5/2021 | Sharpe et al. |
| 2021/0165759 | A1 | 6/2021 | Bar-Nissan et al. |
| 2021/0200641 | A1 | 7/2021 | Bafna et al. |
| 2021/0224233 | A1 | 7/2021 | Bafna et al. |
| 2021/0247973 | A1 | 8/2021 | Gupta et al. |
| 2021/0334178 | A1 | 10/2021 | Yang et al. |
| 2021/0344772 | A1 | 11/2021 | Arikatla et al. |
| 2021/0349859 | A1 | 11/2021 | Bafna et al. |
| 2021/0365257 | A1 | 11/2021 | Gopalapura Venkatesh et al. |
| 2021/0390080 | A1 | 12/2021 | Tripathi et al. |
| 2021/0406136 | A1 | 12/2021 | Venkatesh et al. |
| 2022/0004377 | A1 | 1/2022 | Sharpe et al. |
| 2022/0147342 | A1 | 5/2022 | Sharpe et al. |
| 2022/0147495 | A1 | 5/2022 | Sharpe et al. |
| 2022/0155964 | A1 | 5/2022 | Varadharajan et al. |
| 2022/0156107 | A1 | 5/2022 | Bafna et al. |

FOREIGN PATENT DOCUMENTS

| | | |
|---|---|---|
| EP | 1062581 B1 | 10/2003 |
| EP | 1214663 B1 | 6/2006 |
| WO | 2010050944 A1 | 5/2010 |
| WO | 2016018446 A1 | 2/2016 |

OTHER PUBLICATIONS

"Nutanix Files Guide"; Nutanix; Sep. 14, 2018; pp. all.
"Setting Up and Using Acropolis File Services (AFS) on Nutanix AOS 5.0"; Virtual Dennis—Sharing Technical Tips Learned the Hard Way; Posted Dec. 30, 2016; pp. all.
Bas van Kaam "New in AOS 5.0: Nutanix Acropolis File Services" basvankaam.com; Jan. 5, 2017; pp. all.
Cano, Ignacio et al. "Curator: Self-Managing Storage for Enterprise Clusters"; University of Washington; published Mar. 2017; pp. all.
Dell: "High Availability and Data Protection With Dell EMC Isilon Scale-Out NAS"; Jul. 2019, Dell Inc., pp. all.
Jay Bounds "High-Availability (HA) Pair Controller Configuration Overview and Best Practices"; NetApp; Feb. 2016; pp. all.
Jorge Costa "High Availability Setup Using Veritas Cluster Server and NetApp Synchronous SnapMirror—One button Failover/ Failback with SnapMirror Sync and Veritas Cluster Server"; NetApp Community; Nov. 18, 2010; pp. all.
NetApp "Preparing Storage Systems for Snapmirror Replication"; Apr. 2005, NetApp, Inc., pp. all.
NetApp; "Clustered Data Ontap 8.2 File Access Management Guide for CIFS"; Feb. 2014 (year 2014); pp. all.
Poitras, Steven. "The Nutanix Bible" (Sep. 1, 2020), from https:// nutanixbible.com/; pp. all.
Poitras, Steven. "The Nutanix Bible" (Sep. 17, 2019), from https:// nutanixbible.com/ pp. all.
Poitras, Steven. "The Nutanix Bible" (Jul. 25, 2019), from https:// nutanixbible.com/ pp. all.
U.S. Appl. No. 15/829,602 entitled "Handling Permissions for Virtualized File Servers", filed Dec. 1, 2017, pp. all.
U.S. Appl. No. 17/129,425, titled "Parallel Change File Tracking in a Distributed File Server Virtual Machine (FSVM) Architecture", filed Dec. 21, 2020; pp. all.
Young-Woo Jung et al. "Standard-Based Virtual Infrastructure Resource Management for Distributed and Heterogeneous Servers"; Feb. 15, 2009; ICACT; pp. all.

U.S. Appl. No. 15/966,943 titled "Virtualized Server Systems and Methods Including Domain Joining Techniques" filed Apr. 30, 2018, pp. all.
U.S. Appl. No. 16/687,327, titled "Virtualized File Server Rolling Upgrade", filed Nov. 19, 2019, pp. all.
U.S. Appl. No. 16/144,637, titled "Computing Node Clusters Supporting Network Segmentation", filed Sep. 27, 2018, pp. all.
Dell EMC; Dell EMC Isilon OneFS Operating System; Scale-out NAS to maximize the data capital and business value of your unstructured data; 2020, pp. all.
Dell EMC; White Paper; Dell EMC Isilon OneFS Operating System; Powering the Isilon Scale-Out Storage Platform; Dec. 2019, pp. all.
EMC Isilon OneFS Operating System; Powering scale-out storage for the new world of Big Data in the enterprise; www.EMC.com; captured Feb. 2020, pp. all.
Isilon OneFS, Version 8.0.1: Web Administration Guide; Published Oct. 2016, pp. all.
U.S. Appl. No. 15/833,255, entitled "Cloning Virtualized File Servers", filed Dec. 6, 2017, pp. all.
U.S. Appl. No. 15/833,391, entitled "Virtualized Server Systems and Methods Including Scaling of File System Virtual Machines", filed Dec. 6, 2017, pp. all.
U.S. Appl. No. 15/422,220, entitled " Virtualized File Server" filed Feb. 1, 2017, pp. all.
U.S. Appl. No. 15/829,340, entitled "Configuring Network Segmentation for a Virtualization Environment", filed Dec. 1, 2017, pp. all.
U.S. Appl. No. 15/829,731, entitled "Transparent Referrals for Distributed File Servers", filed Dec. 1, 2017, pp. all.
U.S. Appl. No. 15/829,781, entitled "Virtualized Server Systems and Methods Including Load Balancing for Virtualized File Servers", filed Dec. 1, 2017, pp. all.
U.S. Appl. No. 15/832,310 entitled "Disaster Recovery for Distributed File Servers, Including Metadata Fixers", filed Dec. 5, 2017, pp. all.
U.S. Appl. No. 16/140,250 titled "Virtualized File Server Data Sharing" filed Sep. 24, 2018, pp. all.
U.S. Appl. No. 16/160,618 titled "Virtualized File Server Backup To Cloud" filed Oct. 15, 2018, pp. all.
U.S. Appl. No. 16/942,929 titled "Method Using Access Information in a Distributed File Server Virtual Machine (FSVM) Architecture, Including Web Access"; filed Jul. 30, 2020, pp. all.
U.S. Appl. No. 16/944,323 titled "Actions Based on File Tagging in a Distributed File Server Virtual Machine (FSVM) Environment", filed Jul. 31, 2020, pp. all.
U.S. Appl. No. 17/091,758 titled "Virtualized File Server Distribution Across Clusters", filed Nov. 6, 2020, pp. all.
"Enabling or disabling SMB automatic node referrals", NetApp https://docs.netapp.com/ontap-9/index.jsp?topic=%2Fcom.netapp. doc.cdot-famg-cifs%2FGUID-AC7E8515-3A4C-4BB5-A8C8-38B565C952E0.html Captured Sep. 19, 2019, pp. all.
"Guaranteeing throughput with QoS", NetApp https://docs.netapp. com/ontap-9/index.jsp?topic=%2Fcom.netapp.doc.pow-perf-mon% 2FGUID-77DF9BAF-4ED7-43F6AECE-95DFB0680D2F.html Captured Sep. 19, 2019, pp. all.
"How to troubleshoot the 'Autolocation' feature in Clustered Data ONTAP", NetApp https://kb.netapp.com/app/answers/answer_view/ a_id/1030857/loc/en_US#_highlight Captured Sep. 19, 2019, pp. all.
"How to Troubleshoot the 'Autolocation' feature in Clustered Data ONTAP—Results", NetApp https://kb.netapp.com/app/results/kw/ autolocation/ Captured Sep. 19, 2019, pp. all.
"Hybrid Cloud Storage with Cloudian HyperStore and Amazon S3", Cloudian Inc. www.cloudian.com 2014, pp. all.
"Improving client response time by providing SMB automatic node referrals with Auto Location", NetApp https://library.netapp.com/ ecmdocs/ECMP1196891/html/GUID-0A5772A4-A6D7-4A00-AC2A-92B868C5B3B5.html Captured Sep. 19, 2019, pp. all.
"Managing Workloads", NetApp https://docs.netapp.com/ontap-9/ index.jsp?topic=%2Fcom.netapp.doc.pow-perf-mon%2FGUID-13D35FC5-AF37-4BBD-8A8E-B10B41451A16.html captured Sep. 19, 2019, pp. all.

(56) References Cited

OTHER PUBLICATIONS

"Nutanix AFS—Introduction & Steps For Setting Up", Retrieved from https://virtual building blocks.com/2018/01/03/nutanix-afs-introduction-steps-for-setting-up/ (Year: 2018), Jan. 3, 2018, 1-23.
"Protect Your Data With NetApp Element Software", Solution Brief NetApp, 2018, pp. all.
Kemp, Erik "NetApp SolidFire SnapMirror Architecture and Configuration", Technical Report, NetApp, Dec. 2017, pp. all.
Kleyman, Bill "How Cloud Computing Changes Storage Tiering", https://www.datacenterknowledge.com, captured Jun. 4, 2019, Nov. 12, 2015, pp. all.
Poitras, Steven. "The Nutanix Bible" (Mar. 2, 2020), from https://nutanixbible.com/ pp. all.
Poitras, Steven. "The Nutanix Bible" (Jan. 11, 2014), from https://stevenpoitras.com/the-nutanix-bible/ (Publication date based on indicated capture date by Archive.org; first publication date unknown), pp. all.
Poitras, Steven. "The Nutanix Bible" (Jan. 12, 2016), from https://nutanixbible.com/ pp. all.
Poitras, Steven. "The Nutanix Bible" (Oct. 15, 2013), from http://stevenpoitras.com/the-nutanix-bible/ (Publication date based on indicated capture date by Archive.org; first publication date unknown), pp. all.
Poitras, , Poitras, Steven. "The Nutanix Bible" (Jun. 20, 2014), from https://stevenpoitras.com/the-nutanix-bible/ (Publication date based on indicated capture date by Archive.org; first publication date unknown), pp. all.
Poitras, Steven, "The Nutanix Bible" (Jun. 25, 2018), from https://nutanixbible.com/ pp. all.
Poitras, Steven. "The Nutanix Bible" (Jan. 3, 2017), from https://nutanixbible.com/ pp. all.
Poitras, Steven. "The Nutanix Bible" (Jan. 3, 2018), from https://nutanixbible.com/ pp. all.
Poitras, Steven. "The Nutanix Bible" (Sep. 4, 2015), from https://nutanixbible.com/ pp. all.
Poitras, Steven. "The Nutanix Bible" (Jan. 7, 2015), from http://stevenpoitras.com/the-nutanix-bible/ (Publication date based on indicated capture date by Archive.org; first publication date unknown), pp. all.
Poitras, Steven. "The Nutanix Bible" (Jan. 8, 2019), from https://nutanixbible.com/ pp. all.
Poitras, Steven. "The Nuranix Bible" (Jun. 3, 2017), from https://nutanixbible.com/ pp. all.
Poitras, Steven. "The Nutanix Bible" (Jun. 9, 2015), from http://stevenpoitras.com/the-nutanix-bible/ (Publication date based on indicated capture date by Archive.org; first publication date unknown), pp. all.
Poitras, Steven. "The Nutanix Bible" (Jun. 9, 2016), from https://nutanixbible.com/ pp. all.
U.S. Appl. No. 17/169,137 titled "Virtualized File Server Data Sharing", filed Feb. 5, 2021, pp. all.
Poitras, Steven. "The Nutanix Bible" (Mar. 2, 2021), from https://nutanixbible.com/ pp. all.
U.S. Appl. No. 17/180,257 titled "Virtualized File Server User Views" filed Feb. 19, 2021, pp. all.
Administering VMware vSAN—VMware vSphere 7.0, 2015-2020, pp. 1-114.
"Virtual Disk Manager User's Guide: Virtual Disk Development Kit", vmware.com. 2008, pp. 1-12.
"Characteristics of a vSAN Cluster", May 31, 2019, pp. 1-2.
"Backup vSAN 7 File Share with Veeam Backup & Replication 10", Sysadmin Stories, https://www.sysadminstories.com/2020/06/backup-vsan-7-file-share-with-veeam.html, Jun. 2, 2020, pp. 1-7.
"VSAN File Services Tech Note | VMware", 2021, pp. 1-7.
"VSAN Monitoring and Troubleshooting—VMware vSphere 7.0", https://docs.vmware.com/, 2018, pp. 1-61.
"VSAN Performance Graphs in the vSphere Web Client (2144493)", Nov. 9, 2020, pp. 1-42.
"VSphere Availability—VMware vSphere 6.7", https://docs.vmware.com/, Jan. 11, 2019, pp. 1-105.
"VSphere Storage—VMware vSphere 6.7", https://docs.vmware.com/, Jan. 4, 2021, pp. 1-382.
Birk, Ryan, "How it Works: Understanding vSAN Architecture Components", altaro.com, Feb. 28, 2018, pp. 1-10.
Cormac "Native File Services for vSAN 7", CormacHogan.com, Mar. 11, 2020, pp. 1-23.
Feroce, Danilo "Leveraging VMware vSAM for Highly Available Management Clusters", VMware, Inc., Version 2.9, VMware, Inc., Jan. 2018, pp. 1-22.
Fojta, Tomas "Quotas and Quota Policies in VMware Cloud Director—Tom Fojta's Blog", Nov. 6, 2020, pp. 1-4.
Fojta, Tomas , "vSAN File Services with vCloud Director—Tom Fojta's Blog", (wordpress.com) ("Fojta Blog"), pp. 1-8.
Seget, Vladan , "VMware vSAN 7 now with native file services and quotas", May 1, 2020, pp. all.
Seget, Vladan , "VMware vSphere 7.0 and vSAN storage improvements", Apr. 1, 2020, pp. 1-12.
Sturniolo, Andy , "VMware vSAN File Services and Veeam", Veeam Blog, https://www.veeam.com/blog/veeam-backup-vsan-file-services.html, Jul. 22, 2020, pp. 1-9.
Ruth, Paul "Autonomic Live Adaption of Virtual Computational Environments in a Multi-Domain Infrastructure"; 2006 IEEE international Conference on Autonomic Computing, 2006, pp. 5-14.
U.S. Appl. No. 17/865,907 titled "Virtualized File Server Deployment" filed Jul. 15, 2022.
U.S. Appl. No. 17/866,225 titled Virtualized File Server Disaster Recovery filed Jul. 15, 2022.
"Citrix XenDesktop 7.1 on Microsoft Hyper-V Server 2012 R2 on Nutanix Virtual Computing Platform", Citrix APAC Solutions, Jun. 25, 2014, pp. 1-94.
Jeffrey, Hemmes , et al., "Cacheable Decentralized Groups for Grid Resource Access Control", 2006 7th IEEE/ACM International Conference on Grid Computing Department of Computer Science and Engineering, University of Notre Dame, Sep. 2006, pp. 192-199.
Lye, Ben , "Implementing Windows Server 2008 FileSystem Quotas", Nov. 19, 2009, pp. 1-17.
U.S. Appl. No. 17/448,315 titled "Virtualized File Server" filed Sep. 21, 2021, pp. all.
VMware vSphere VMFS "Technical Overview and Best Practices", a VMware Technical White Paper updated for VMware vSphere 5.1, Version 3.0; Nov. 27, 2012, pp. all.
U.S. Appl. No. 17/580,555 titled "Virtualized File Server" filed Jan. 20, 2022.
U.S. Appl. No. 17/581,418 titled "File Server Managers and Systems for Managing Virtualized File Servers" filed Jan. 21, 2022.
U.S. Appl. No. 17/585,403 titled "Virtualized File Server Smart Data Ingestion" filed Jan. 27, 2022.
U.S. Appl. No. 17/648,796 titled "Virtualized Server Systems and Methods Including Scaling of File System Virtual Machines" filed Jan. 24, 2022.
U.S. Appl. No. 17/238,001 titled "Cloning Virtualized File Servers" filed Apr. 22, 2021, pp. all.
U.S. Appl. No. 17/302,343 titled "Disaster Recovery for Distributed File Servers, Including Metadata Fixers" filed Apr. 30, 2021, pp. all.
U.S. Appl. No. 17/443,009, titled "Scope-Based Distributed Lock Infrastructure for Virtualized File Server" filed Jul. 19, 2021, pp. all.
"Designing and Sizing Virtual SAN Fault Domains", Administering VMware Virtual SAN; VMware vSphere 6.5; vSAN 6.6; https://docs.vmware.com/en/VMware-vSphere/6.5/virtual-san-66-administration-guide.pdf captured Aug. 20, 2021, copyright 2017, pp. 34.
"Path Failover and Virtual Machines", vSphere Storage; Update 2; VMware vSphere 7.0; VMware ESXi 7.0; vCenter Server 7.0; https://docs.vmware/com/en/VMware-vSphere/7.0/vsphere-esxi-vcenter-server-702-storage-guide.pdf Jun. 25, 2021, pp. 238
"Tech TopX: AHV One Click Upgrade", Screen captures from YouTube video clip entitled "Tech TopX: AHV One Click Upgrade," 13 pages, uploaded on Dec. 8, 2015 by user "Nutanix University". Retrieved from Internet: https://www.youtube.com/watch?v=3dALdzw6qZM Dec. 8, 2015, pp. all.
"Understanding Multipathing and Failover", vSphere Storage; VMware vSphere 7.0; VMware ESXi 7,0; vCenter Server 7.0 https://docs.

(56) References Cited

OTHER PUBLICATIONS vmware.com/en/VMware-vSphere/7.0/vsphere-esxi-vcenter-server-702-storage-guide.pdf Jun. 25, 2021, pp. 234-268.
"VMware vCenter Server: Centrally Mananged Virtual Infrastructure Delivered with Confidence", VMWare Datasheet; https://www.vmware.com/content/dam/digitalmarketing/vmware/en/pdf/products/vCenter/vmware-vcenter-server-datasheet.pdf captured Aug. 20, 2021, copyright 2015, pp. 1-2.
"VMware VSAN 7.0 Release Notes", VMware; https://docs.vmware.com/en/VMware-vSphere/7.0/rn/vmware-vsan-70-release-notes.html Mar. 8, 2021, pp. 1-12.
"VSAN 7.0 U2 Proof of Concept Guide", VMwareStorage; https://images.core.vmware.com/sites/default/files/resource/vsan_70_u2_proof_of_concept_guide_noindex.pdf printed May 18, 2021, Apr. 2021, pp. 1-267.
"VSAN Health Service—File Service—File Server Health (77165)", VMware, Knowledge Base; https://kb.vmware.com/s/article/77165 May 15, 2021, pp. 1-5.
"VSan Planning and Deployment", Update 2 VMWare vSphere 6.7; VMware vSAN 6.7; https://docs.vmware/com/en/VMware-vSphere/6.7/vsan-673-planning-deployment-guide.pdf Aug. 20, 2019, pp. 1-85.
"VSan Stretched Cluster Guide", VMwareStorage; https://images.core.vmware.com/sites/default/files/resource/vsan_stretched_cluster_guide_noindex.pdf printed Jun. 24, 2021, Jun. 2020, pp. 1-62.
Bhardwaj, Rishi "The Wonderful World of Distributed Systems and the Art of Metadata Management", Nutanix, Inc., Sep. 24, 2015, pp. 1-8 https://www.nutanix.com/blog/the-wonderful-world-of-distributed-systems-and-metadata-management captured Aug. 19, 2021.
Hogan, Cormac "New updates from Nutanix—NOS 3.0 and NX-3000", https://cormachogan.com/2012/12/20/new-from-nutanix-nos-3-0-nx-3000/ Dec. 20, 2012, pp. 1-7.
Leibovici, Andre "Nutanix One-Click Upgrade now takes care of Firmware and Hypervisor too!", myvirtualcloud.net https://myvirtualcloud.net/nutanix-one-click-upgrade-now-takes-care-of-firmware-and-hypervisor-too/ Jul. 31, 2014, pp. 1-4.
Rajendran, Cedric "Working with vSAN Health Checks", VMware vSan Virtual Blocks Blog; https://blogs.vmware.com/virtualblocks/2019/07/18/working-with-vsan-health-checks/ Jul. 18, 2019, pp. 1-6.

\* cited by examiner

VIRTUALIZED SERVER SYSTEMS AND METHODS INCLUDING DOMAIN JOINING TECHNIQUES

CROSS REFERENCE TO RELATED APPLICATION(S)

This application is a divisional of U.S. patent application Ser. No. 15/966,943, filed Apr. 30, 2018 and issued as U.S. Pat. No. 11,086,826 on Aug. 10, 2021. The aforementioned application, and issued patent, is incorporated herein by reference, in its entirety, for any purpose.

TECHNICAL FIELD

Examples described herein generally relate to file servers in virtualized environments. Examples of domain join processes are described which may facilitate joining one or more domains to the file server without providing security credentials to the file server.

BACKGROUND

A "virtual machine" or a "VM" generally refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization may work by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization may allow one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines, Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Furthermore, there are now products that can aggregate multiple physical machines, running virtualization environments to not only utilize the processing power of the physical devices to aggregate the storage of the individual physical devices to create a logical storage pool wherein the data may be distributed across the physical devices but appears to the virtual machines to be part of the system that the virtual machine is hosted on. Such systems operate under the covers by using metadata, which may be distributed and replicated any number of times across the system, to locate the indicated data. These systems are commonly referred to as clustered systems, wherein the resources of the group are pooled to provide logically combined, but physically separate systems.

Virtualization environments may become increasingly complex to maintain and administer. Moreover, maintenance and administration of virtualization environments may present security risks, and maintaining secure access to portions of the system without compromising access credentials may be desirable.

DETAILED DESCRIPTION

Figure 1A:
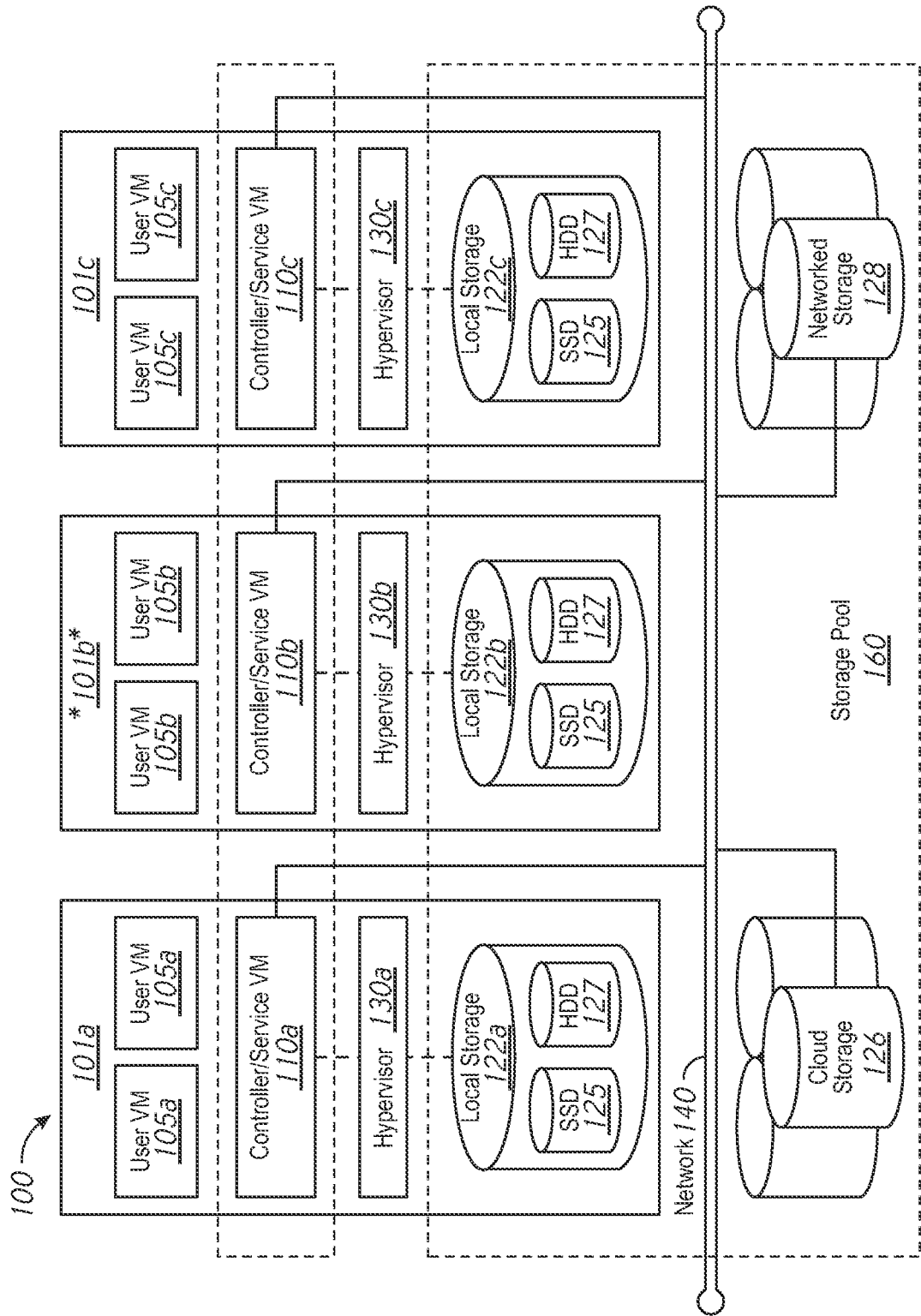
FIG. 1A illustrates a clustered virtualization environment according to some particular embodiments.

Particular embodiments provide an architecture for implementing virtualized file servers in a virtualization environment. In particular embodiments, a virtualized file server may include a set of File Server Virtual Machines (VMs) that execute on host machines and process storage access operations requested by user VMs executing on the host machines. The file server VMs may communicate with storage controllers provided by Controller/Service VMs executing on the host machines to store and retrieve storage items, such as files and folders, on storage devices associated with the host machines. The storage items may be distributed amongst multiple host machines. The file server VMs may maintain a storage map, such as a sharding map, that maps names or identifiers of storage items, such as folders, files, or portions thereof, to their locations. When a user application executing in a user VM on one of the host machines initiates a storage access operation, such as reading or writing data from or to a storage item or modifying metadata associated with the storage item, the user VM may send the storage access operation in a request to one of the file server VMs on one of the host machines. In particular embodiments, a file server VM executing on a host machine that receives a storage access request may use the storage map to determine whether the requested storage item is located on the host machine (or otherwise associated with the file server VM or Controller/Service VM on the host machine). If so, the file server VM executes the requested operation. Otherwise, the file server VM responds to the request with an indication that the requested storage item is not on the host machine, and may redirect the requesting user VM to the host machine on which the storage map indicates the storage item is located. The client may cache the address of the host machine on which the storage item is located, so that the client may send subsequent requests for the storage item directly to that host machine.

In particular embodiments, the virtualized file server determines the location, e.g., host machine, at which to store a storage item such as a file or folder when the storage item is created. A file server VM may attempt to create a file or folder using a Controller/Service VM on the same host machine as the user VM that requested creation of the file, so that the Controller/Service VM that controls access operations to the storage item is co-located with the requesting user VM. In this way, file access operations between the user VM that is known to be associated with the storage item and is thus likely to access the storage item again (e.g., in the near future and/or on behalf of the same user) may use local communication or short-distance communication to improve performance, e.g., by reducing access times or increasing access throughput. Further, the virtualized file server may also attempt to store the storage item on a storage device that is local to the Controller/Service VM being used to create the storage item, so that storage access operations between the Controller/Service VM and the storage device may use local or short-distance communication.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

FIG. 1A illustrates a clustered virtualization environment according to some particular embodiments. The architecture of FIG. 1A can be implemented for a distributed platform that contains multiple host machines 100a-c that manage multiple tiers of storage. The multiple tiers of storage may include network-attached storage (NAS) that is accessible through network 140, such as, by way of example and not limitation, cloud storage 126, which may be accessible through the Internet, or local network-accessible storage 128 (e.g., a storage area network (SAN)). Unlike the prior art, the present embodiment also permits local storage 122 that is within or directly attached to the server and/or appliance to be managed as part of storage pool 160. Examples of such storage include Solid State Drives 125 (henceforth "SSDs"), Hard Disk Drives 127 (henceforth "HDDs" or "spindle drives"), optical disk drives, external drives (e.g., a storage device connected to a host machine via a native drive interface or a direct attach serial interface), or any other directly attached storage. These collected storage devices, both local and networked, form storage pool 160. Virtual disks (or "vDisks") can be structured from the storage devices in storage pool 160, as described in more detail below. As used herein, the term vDisk refers to the storage abstraction that is exposed by a Controller/Service VM (CVM) to be used by a user VM. In some embodiments, the vDisk is exposed via iSCSI ("interne small computer system interface") or NFS ("network file system") and is mounted as a virtual disk on the user VM.

Each host machine 100a-c runs virtualization software, such as VMWARE ESX(I), MICROSOFT HYPER-V, or REDHAT KVM. The virtualization software includes hypervisor 130a-c to manage the interactions between the underlying hardware and the one or more user VMs 101a, 102a, 101b, 102b, 101c, and 102c that run client software. Though not depicted in FIG. 1A, a hypervisor may connect to network 140. In particular embodiments, a host machine 100 may be a physical hardware computing device; in particular embodiments, a host machine 100 may be a virtual machine.

CVMs 110a-c are used to manage storage and input/output ("I/O") activities according to particular embodiments. These special VMs act as the storage controller in the currently described architecture. Multiple such storage controllers may coordinate within a cluster to form a unified storage controller system. CVMs 110 may run as virtual machines on the various host machines 100, and work together to form a distributed system 110 that manages all the storage resources, including local storage 122, networked storage 128, and cloud storage 126. The CVMs may connect to network 140 directly, or via a hypervisor. Since the CVMs run independent of hypervisors 130a-c, this means that the current approach can be used and implemented within any virtual machine architecture, since the CVMs can be used in conjunction with any hypervisor from any virtualization vendor.

A host machine may be designated as a leader node within a cluster of host machines. For example, host machine 100b, as indicated by the asterisks, may be a leader node. A leader node may have a software component designated to perform operations of the leader. For example, CVM 110b on host machine 100b may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node.

Each CVM 110a-c exports one or more block devices or NFS server targets that appear as disks to user VMs 101 and 102. These disks are virtual, since they are implemented by the software running inside CVMs 110a-c. Thus, to user VMs 101 and 102, CVMs 110a-c appear to be exporting a clustered storage appliance that contains some disks. All user data (including the operating system) in the user VMs 101 and 102 reside on these virtual disks.

Significant performance advantages can be gained by allowing the virtualization system to access and utilize local storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs. Further details regarding methods and mechanisms for implementing the virtualization environment illustrated in FIG. 1A are described in U.S. Pat. No. 8,601,473, which is hereby incorporated by reference in its entirety.

Figure 1B:
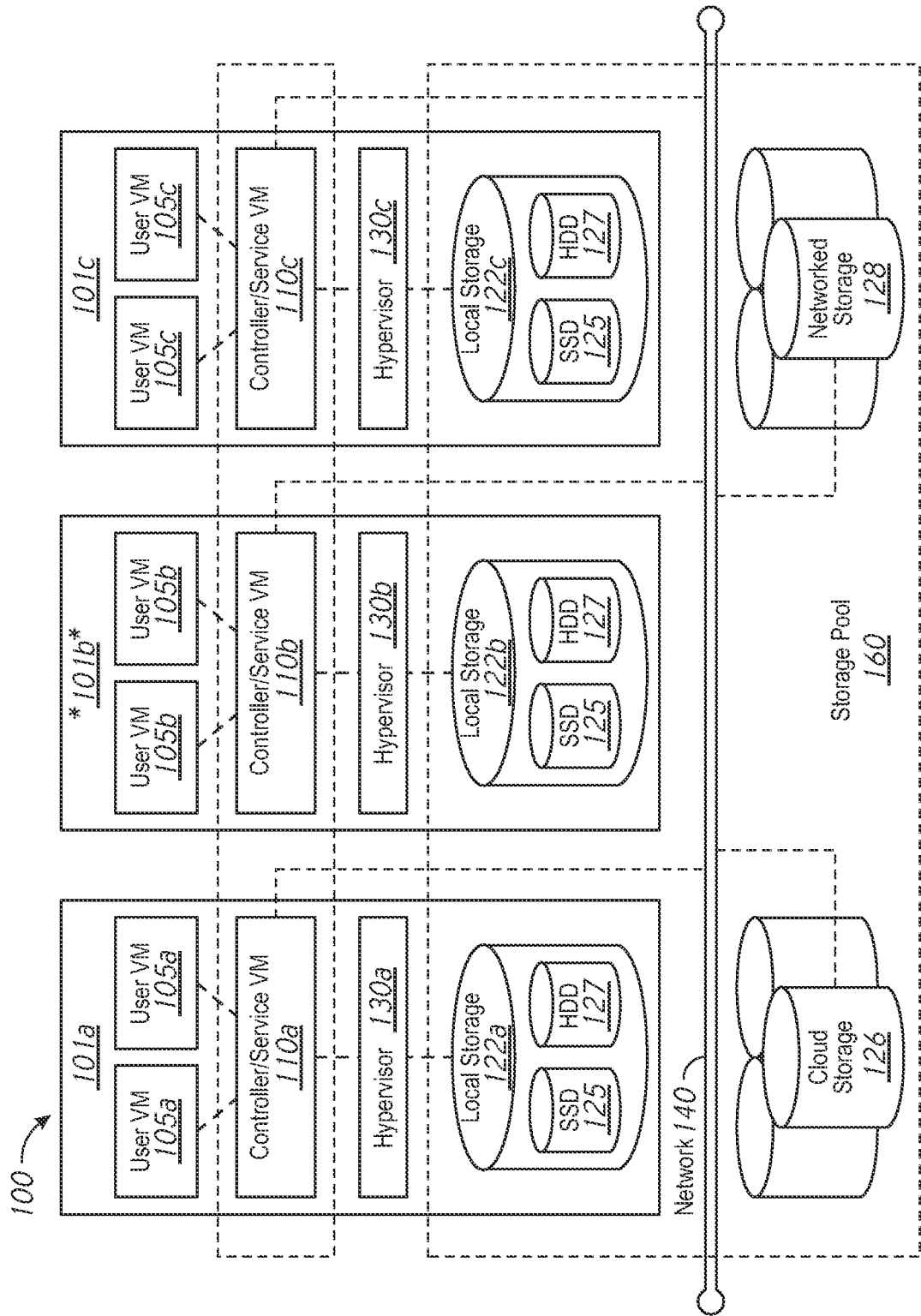
FIG. 1B illustrates data flow within an example clustered virtualization environment according to particular embodiments.

FIG. 1B illustrates data flow within an example clustered virtualization environment according to particular embodiments. As described above, one or more user VMs and a CVM may run on each host machine 100 along with a hypervisor. As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 160. Additionally or alternatively, Controller/Service VM 110a-c may present an emulated storage controller either to the hypervisor or to user VMs to facilitate I/O operations. CVMs 110a-c may be connected to storage within storage pool 160. CVM 110a may have the ability to perform I/O operations using local storage 122a within the same host machine 100a, by connecting via network 140 to cloud storage 126 or networked storage 128, or by connecting via network 140 to local storage 122b-c within another host machine 100b-c (e.g., via connecting to another CVM 110b or 110c). In particular embodiments, any suitable computing system may be used to implement a host machine 100, such as the computing system 700 shown in FIG. 7.

Figure 2A:
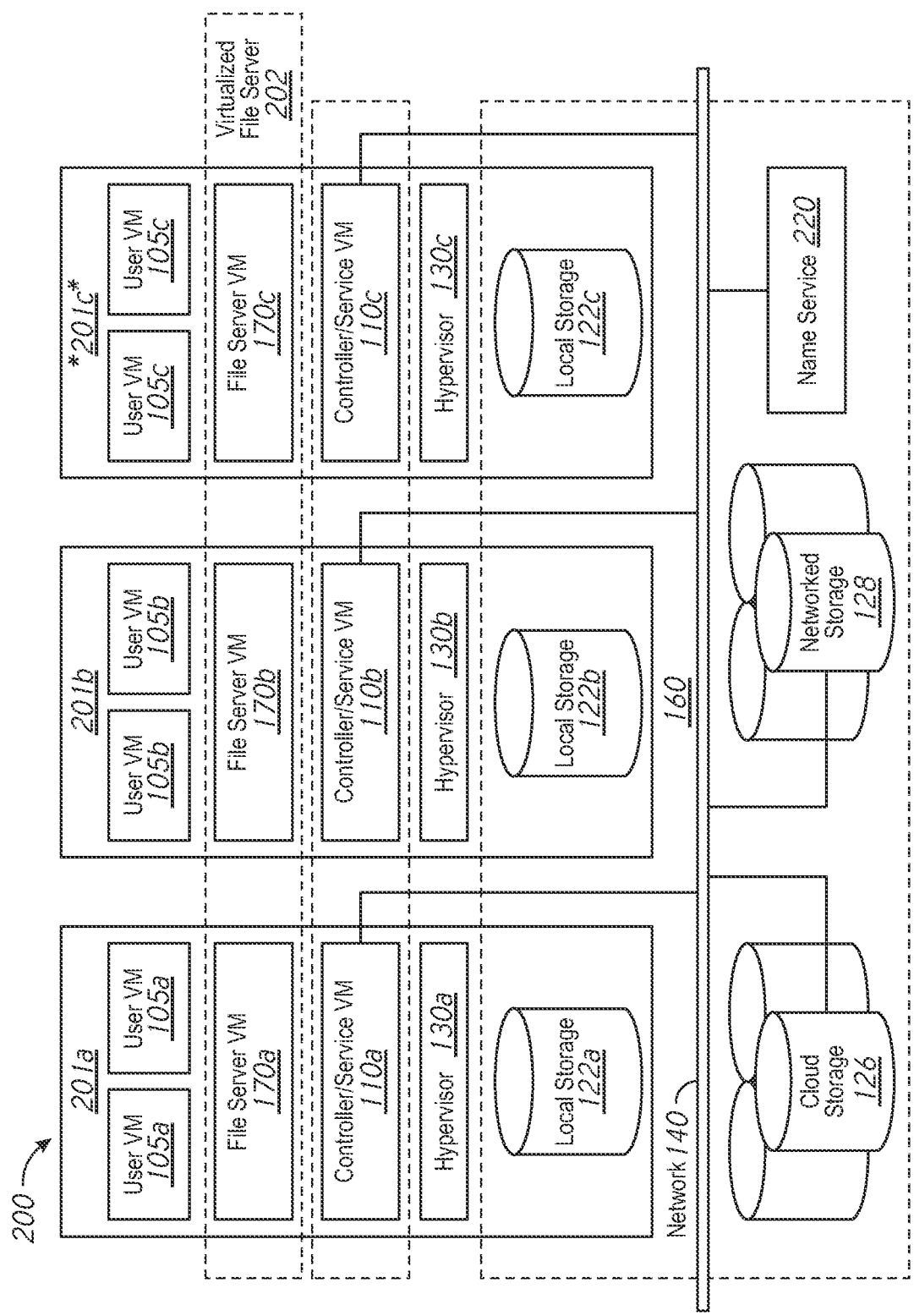
FIG. 2A illustrates a clustered virtualization environment implementing a virtualized file server (VFS) 202 according to particular embodiments.

FIG. 2A illustrates a clustered virtualization environment implementing a virtualized file server (VFS) 202 according to particular embodiments. In particular embodiments, the VFS 202 provides file services to user virtual machines (user VMs) 101 and 102. The file services may include storing and retrieving data persistently, reliably, and efficiently. The user virtual machines 101 and 102 may execute user processes, such as office applications or the like, on host machines 200a-c. The stored data may be represented as a set of storage items, such as files organized in a hierarchical structure of folders (also known as directories), which can contain files and other folders.

In particular embodiments, the VFS 202 may include a set of File Server Virtual Machines (FSVMs) 170a-c that execute on host machines 200a-c and process storage item access operations requested by user VMs 200a-c executing on the host machines 200a-c. The FSVMs 170a-c may communicate with storage controllers provided by CVMs 110a-c executing on the host machines 200a-c to store and retrieve files, folders, or other storage items on local storage 122a-c associated with, e.g., local to, the host machines 200a-c. The network protocol used for communication between user VMs 101 and 102, FSVMs 170a-c, and CVMs 110a-c via the network 140 may be Internet Small Computer Systems Interface (iSCSI), Server Message Block (SMB), Network File System (NFS), pNFS (Parallel NFS), or another appropriate protocol.

For the purposes of VFS 202, host machine 200c may be designated as a leader node within a cluster of host machines. In this case, FSVM 170c on host machine 100c may be designated to perform such operations. A leader may be responsible for monitoring or handling requests from FSVMs on other host machines throughout the virtualized environment. If FSVM 170c fails, a new leader may be designated for VFS 202.

In particular embodiments, the user VMs 101 and 102 may send data to the VFS 202 using write requests, and may receive data from it using read requests. The read and write requests, and their associated parameters, data, and results, may be sent between a user VM 101a and one or more file server VMs (FSVMs) 170a-c located on the same host machine as the user VM 101a or on different host machines from the user VM 101a. The read and write requests may be sent between host machines 200a-c via network 140, e.g., using a network communication protocol such as iSCSI, CIFS, SMB, TCP, IP, or the like. When a read or write request is sent between two VMs located on the same one of the host machines 200a-c (e.g., between the user VM 101a and the FSVM 170a located on the host machine 200a), the request may be sent using local communication within the host machine 200a instead of via the network 140. As described above, such local communication may be substantially faster than communication via the network 140. The local communication may be performed by, e.g., writing to and reading from shared memory accessible by the user VM 101a and the FSVM 170a, sending and receiving data via a local "loopback" network interface, local stream communication, or the like.

In particular embodiments, the storage items stored by the VFS 202, such as files and folders, may be distributed amongst multiple host machines 200a-c. In particular embodiments, when storage access requests are received from the user VMs 101 and 102, the VFS 202 identifies host machines 200a-c at which requested storage items, e.g., folders, files, or portions thereof, are stored, and directs the user VMs 101 and 102 to the locations of the storage items. The FSVMs 170 may maintain a storage map, such as a sharding map 360 (shown in FIG. 3C), that maps names or identifiers of storage items to their corresponding locations. The storage map may be a distributed data structure of which copies are maintained at each FSVM 170a-c and accessed using distributed locks or other storage item access operations. Alternatively, the storage map may be maintained by a leader node such as the host machine 200c, and the other host machines 200a and 200b may send requests to query and update the storage map to the leader host machine 200c. Other implementations of the storage map are possible using appropriate techniques to provide asynchronous data access to a shared resource by multiple readers and writers. The storage map may map names or identifiers of storage items in the form of text strings or numeric identifiers, such as folder names, files names, and/or identifiers of portions of folders or files (e.g., numeric start offset positions and counts in bytes or other units) to locations of the files, folders, or portions thereof. Locations may be represented as names of FSVMs 170a-c, e.g., "FSVM-1", as network addresses of host machines 200a-c on which FSVMs 170a-c are located (e.g., "ip-addr1" or 128.1.1.10), or as other types of location identifiers.

When a user application executing in a user VM 101a on one of the host machines 200a initiates a storage access operation, such as reading or writing data, the user VM 101a may send the storage access operation in a request to one of the FSVMs 170a-c on one of the host machines 200a-c. A FSVM executing on a host machine 200b that receives a storage access request may use the storage map to determine whether the requested file or folder is located on the host machine 200b (or otherwise associated with the FSVM 170b or Controller/Service VM 110b on the host machine 200b). If the requested file or folder is located on the host machine 200b (or otherwise associated with a VM on it), the FSVM 170b executes the requested storage access operation. Otherwise, the FSVM 170b responds to the request with an indication that the data is not on the host machine 200b, and may redirect the requesting user VM 101a to the host machine 200c on which the storage map indicates the file or folder is located. The client may cache the address of the host machine 200c on which the file or folder is located, so that it may send subsequent requests for the file or folder directly to the host machine 200c.

As an example and not by way of limitation, the location of a file or a folder may be pinned to a particular host machine 200a by sending a file service operation that creates the file or folder to a CVM 110a located on the particular host machine 200a. The CVM 110a subsequently processes file service commands for that file and sends corresponding storage access operations to storage devices associated with the file. The CVM 110a may associate local storage 122a with the file if there is sufficient free space on local storage 122a. Alternatively, the CVM 110a may associate a storage device located on another host machine 200b, e.g., in local storage 122b, with the file under certain conditions, e.g., if there is insufficient free space on the local storage 122a, or if storage access operations between the CVM 110a and the file are expected to be infrequent. Files and folders, or portions thereof, may also be stored on other storage devices, such as the network-attached storage (NAS) 128 or the cloud storage 126 of the storage pool 160.

In particular embodiments, a name service 220, such as that specified by the Domain Name System (DNS) Internet protocol, may communicate with the host machines 200a-c via the network 140 and may store a database of domain name (e.g., host name) to IP address mappings. The name service 220 may be queried by the User VMs 101 e.g., to determine the IP address of a particular host machine 200a-c given a name of the host machine, e.g., to determine the IP address of the host name ip-addr1 for the host machine 200a. The name service 220 may be located on a separate server computer system or on one or more of the host machines 200. The names and IP addresses of the host machines of the VFS instance 202, e.g., the host machines 200, may be stored in the name service 220 so that the user VMs 101 may determine the IP address of each of the host machines 200. The name of each VFS instance 202, e.g., FS1, FS2, or the like, may be stored in the name service 220 in association with a set of one or more names that contains the name(s) of the host machines 200 of the VFS instance 202. For example, the file server instance name FS1.domain.com may be associated with the host names ip-addr1, ip-addr2, and ip-addr3 in the name service 220, so that a query of the name service 220 for the server instance name "FS1" or "FS1.domain.com" returns the names ip-addr1, ip-addr2, and ip-addr3. Further, the name service 220 may return the names in a different order for each name lookup request, e.g., using round-robin ordering, so that the sequence of names (or addresses) returned by the name service for a file server instance name is a different permutation for each query until all the permutations have been returned in response to requests, at which point the permutation cycle starts again, e.g., with the first permutation. In this way, storage access requests from user VMs 101 may be balanced across the host machines 200, since the user VMs 101 submit requests to the name service 220 for the address of the VFS instance 202 for storage items for which the user VMs 101 do not have a record or cache entry, as described below.

In particular embodiments, each FSVM 170 may have two IP addresses: an external IP address and an internal IP address. The external IP addresses may be used by SMB/CIFS clients, such as user VMs 101, to connect to the FSVMs 170. The external IP addresses may be stored in the name service 220. The IP addresses ip-addr1, ip-addr2, and ip-addr3 described above are examples of external IP addresses. The internal IP addresses may be used for iSCSI communication to CVMs 110, e.g., between the FSVMs 170 and the CVMs 110, and for communication between the CVMs 110 and storage devices in the storage pool 160. Other internal communications may be sent via the internal IP addresses as well, e.g., file server configuration information may be sent from the CVMs 110 to the FSVMs 170 using the internal IP addresses, and the CVMs 110 may get file server statistics from the FSVMs 170 via internal communication as needed.

Since the VFS 202 is provided by a distributed set of FSVMs 170a-c, the user VMs 101 and 102 that access particular requested storage items, such as files or folders, do not necessarily know the locations of the requested storage items when the request is received. A distributed file system protocol, e.g., MICROSOFT DFS or the like, is therefore used, in which a user VM 101a may request the addresses of FSVMs 170a-c from a name service 220 (e.g., DNS). The name service may send one or more network addresses of FSVMs 170a-c to the user VM 101a, in an order that changes for each subsequent request. These network addresses are not necessarily the addresses of the FSVM 170b on which the storage item requested by the user VM 101a is located, since the name service 220 does not necessarily have information about the mapping between storage items and FSVMs 170a-c. Next, the user VM 170a may send an access request to one of the network addresses provided by the name service, e.g., the address of FSVM 170b. The FSVM 170b may receive the access request and determine whether the storage item identified by the request is located on the FSVM 170b. If so, the FSVM 170b may process the request and send the results to the requesting user VM 101a. However, if the identified storage item is located on a different FSVM 170c, then the FSVM 170b may redirect the user VM 101a to the FSVM 170c on which the requested storage item is located by sending a "redirect" response referencing FSVM 170c to the user VM 101a. The user VM 101a, may then send the access request to FSVM 170c, which may perform the requested operation for the identified storage item.

A particular VFS 202, including the items it stores, e.g., files and folders, may be referred to herein as a VFS "instance" 202 and may have an associated name, e.g., FS1, as described above. Although a VFS instance 202 may have multiple FSVMs distributed across different host machines 200, with different files being stored on different host machines 200, the VFS instance 202 may present a single name space to its clients such as the user VMs 101. The single name space may include, for example, a set of named "shares" and each share may have an associated folder hierarchy in which files are stored. Storage items such as files and folders may have associated names and metadata such as permissions, access control information, size quota limits, file types, files sizes, and so on. As another example, the name space may be a single folder hierarchy, e.g., a single root directory that contains files and other folders. User VMs 101 may access the data stored on a distributed VFS instance 202 via storage access operations, such as operations to list folders and files in a specified folder, create a new file or folder, open an existing file for reading or writing, and read data from or write data to a file, as well as storage item manipulation operations to rename, delete, copy, or get details, such as metadata, of files or folders. Note that folders may also be referred to herein as "directories."

In particular embodiments, storage items such as files and folders in a file server namespace may be accessed by clients such as user VMs 101 by name, e.g., "\Folder-1\File-1" and "\Folder-2\File-2" for two different files named File-1 and File-2 in the folders Folder-1 and Folder-2, respectively (where Folder-1 and Folder-2 are sub-folders of the root folder). Names that identify files in the namespace using folder names and file names may be referred to as "path names." Client systems may access the storage items stored on the VFS instance 202 by specifying the file names or path names, e.g., the path name "\Folder-1\File-1", in storage access operations. If the storage items are stored on a share (e.g., a shared drive), then the share name may be used to access the storage items, e.g., via the path name "\\Share-1\Folder-1\File-1" to access File-1 in folder Folder-1 on a share named Share-1.

In particular embodiments, although the VFS instance 202 may store different folders, files, or portions thereof at different locations, e.g., on different host machines 200, the use of different host machines or other elements of storage pool 160 to store the folders and files may be hidden from the accessing clients. The share name is not necessarily a name of a location such as a host machine 200. For example, the name Share-1 does not identify a particular host machine 200 on which storage items of the share are located. The share Share-1 may have portions of storage items stored on three host machines 200a-c, but a user may simply access Share-1, e.g., by mapping Share-1 to a client computer, to gain access to the storage items on Share-1 as if they were located on the client computer. Names of storage items, such as file names and folder names, are similarly location-independent. Thus, although storage items, such as files and their containing folders and shares, may be stored at different locations, such as different host machines 200a-c, the files may be accessed in a location-transparent manner by clients (such as the user VMs 101 and 102). Thus, users at client systems need not specify or know the locations of each storage item being accessed. The VFS 202 may automatically map the file names, folder names, or full path names to the locations at which the storage items are stored. As an example and not by way of limitation, a storage item's physical location may be specified by the name or address of the host machine 200a-c on which the storage item is located, the name, address, or identity of the FSVM 170a-c that provides access to the storage item on the host machine 200a-c on which the storage item is located, the particular device (e.g., SSD or HDD) of the local storage 122a (or other type of storage in storage pool 160) on which the storage item is located, and the address on the device, e.g., disk block numbers. A storage item such as a file may be divided into multiple parts that may be located on different host machines 200a-c, in which case access requests for a particular portion of the file may be automatically mapped to the location of the portion of the file based on the portion of the file being accessed (e.g., the offset from the beginning of the file and the number of bytes being accessed).

In particular embodiments, VFS 202 determines the location, e.g., particular host machine 200a-c, at which to store a storage item when the storage item is created. For example, a FSVM 170a may attempt to create a file or folder using a Controller/Service VM 110a on the same host machine 200a as the user VM 101a that requested creation of the file, so that the Controller/Service VM 110a that controls access operations to the file folder is co-located with the user VM 101a. In this way, since the user VM 101a is known to be associated with the file or folder and is thus likely to access the file again, e.g., in the near future or on behalf of the same user, access operations may use local communication or short-distance communication to improve performance, e.g., by reducing access times or increasing access throughput. If there is a local CVM 110a on the same host machine as the FSVM 170a, the FSVM 170a may identify it and use it by default. If there is no local CVM 110a on the same host machine as the FSVM 170a, a delay may be incurred for communication between the FSVM 170a and a CVM 110b on a different host machine 200b. Further, the VFS 202 may also attempt to store the file on a storage device that is local to the CVM 110a being used to create the file, such as local storage 122a, so that storage access operations between the CVM 110a and local storage 122a may use local or short-distance communication.

In particular embodiments, if a CVM 110a is unable to store the storage item in local storage 122a, e.g., because local storage 122a does not have sufficient available free space, then the file may be stored in local storage 122b of a different host machine 200b. In this case, the stored file is not physically local to the host machine 200a, but storage access operations for the file are performed by the locally-associated CVM 110a and FSVM 170a, and the CVM 110a may communicate with local storage 122b on the remote host machine 200b using a network file sliming protocol, e.g., iSCSI, SAMBA or the like.

In particular embodiments, if a virtual machine, such as a user VM 101a, CVM 110a, or FSVM 170a, moves from a host machine 200a to a destination host machine 200b, because of resource availability changes, and data items such as files or folders associated with the VM are not locally accessible on the destination host machine 200b, then data migration may be performed for the data items associated with the moved VM to migrate them to the new host machine 200b, so that they are local to the moved VM on the new host machine 200b. FSVMs 170 may detect removal and addition of CVMs 110 (as may occur, for example, when a CVM 110 fails or is shut down) via the iSCSI protocol or other technique, such as heartbeat messages. As another example, a FSVM 170 may determine that a particular file's location is to be changed, e.g., because a disk on which the file is stored is becoming full, because changing the file's location is likely to reduce network communication delays and therefore improve performance, or for other reasons. Upon determining that a file is to be moved, VFS 202 may change the location of the file by, for example, copying the file from its existing location(s), such as local storage 122a of a host machine 200a, to its new location(s), such as local storage 122b of host machine 200b (and to or from other host machines, such as local storage 122c of host machine 200c if appropriate), and deleting the file from its existing location(s). Write operations on the file may be blocked or queued while the file is being copied, so that the copy is consistent. The VFS 202 may also redirect storage access requests for the file from an FSVM 170a at the file's existing location to a FSVM 170b at the file's new location.

In particular embodiments, VFS 202 includes at least three File Server Virtual Machines (FSVMs) 170a-c located on three respective host machines 200a-c. To provide high-availability, there may be a maximum of one FSVM 170a for a particular VFS instance 202 per host machine 200 in a cluster. If two FSVMs 170 are detected on a single host machine 200, then one of the FSVMs 170 may be moved to another host machine automatically, or the user (e.g., system administrator) may be notified to move the FSVM 170 to another host machine. The user may move a FSVM 170 to another host machine using an administrative interface that provides commands for starting, stopping, and moving FSVMs 170 between host machines 200.

In particular embodiments, two FSVMs 170 of different VFS instances 202 may reside on the same host machine 200a. If the host machine 200a fails, the FSVMs 170 on the host machine 200a become unavailable, at least until the host machine 200a recovers. Thus, if there is at most one FSVM 170 for each VFS instance 202 on each host machine 200a, then at most one of the FSVMs 170 may be lost per VFS 202 per failed host machine 200. As an example, if more than one FSVM 170 for a particular VFS instance 202 were to reside on a host machine 200a, and the VFS instance 202 includes three host machines 200a-c and three FSVMs 170, then loss of one host machine would result in loss of two-thirds of the FSVMs 170 for the VFS instance 202, which would be more disruptive and more difficult to recover from than loss of one-third of the FSVMs 170 for the NTS instance 202.

In particular embodiments, users, such as system administrators or other users of the user VMs 101, 102, may expand the cluster of FSVMs 170 by adding additional FSVMs 170. Each FSVM 170a may be associated with at least one network address, such as an IP (Internet Protocol) address of the host machine 200a on which the FSVM 170a resides. There may be multiple clusters, and all FSVMs of a particular VFS instance are ordinarily in the same cluster. The VFS instance 202 may be a member of a MICROSOFT ACTIVE DIRECTORY domain, which may provide authentication and other services such as name service 220.

Figure 2B:
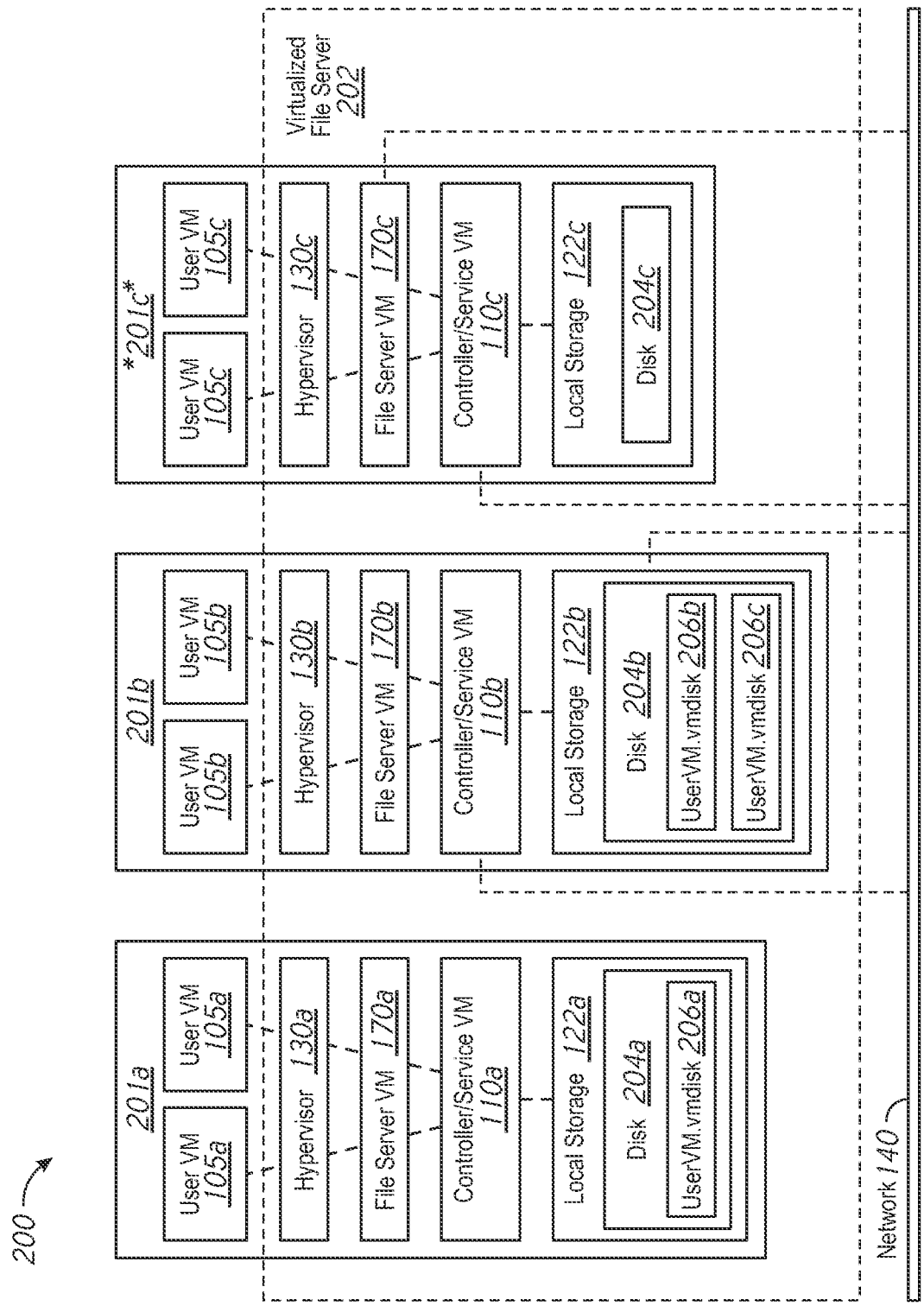
FIG. 2B illustrates data flow within a clustered virtualization environment.

FIG. 2B illustrates data flow within a clustered virtualization environment implementing a VFS instance 202 in which stored items such as files and folders used by user VMs 101 are stored locally on the same host machines 200 as the user VMs 101 according to particular embodiments. As described above, one or more user VMs 101 and a Controller/Service VM 110 may run on each host machine 200 along with a hypervisor 130. As a user VM 101 processes I/O commands (e.g., a read or write operation), the I/O commands may be sent to the hypervisor 130 on the same server or host machine 200 as the user VM 101. For example, the hypervisor 130 may present to the user VMs 101 a VFS instance 202, receive an I/O command, and facilitate the performance of the I/O command by passing the command to a FSVM 170 that performs the operation specified by the command. The VFS 202 may facilitate I/O operations between a user VM 101 and a virtualized file system. The virtualized file system may appear to the user VM 101 as a namespace of mappable shared drives or mountable network file systems of files and directories. The namespace of the virtualized file system may be implemented using storage devices in the local storage 122, such as disks 204, onto which the shared drives or network file systems, files, and folders, or portions thereof, may be distributed as determined by the FSVMs 170. The VFS 202 may thus provide features disclosed herein, such as efficient use of the disks 204, high availability, scalability, and others. The implementation of these features may be transparent to the user VMs 101, 102. The FSVMs 170 may present the storage capacity of the disks 204 of the host machines 200 as an efficient, highly-available, and scalable namespace in which the user VMs 101, 102 may create and access shares, files, folders, and the like.

As an example, a network share may be presented to a user VM 101 as one or more discrete virtual disks, but each virtual disk may correspond to any part of one or more virtual or physical disks 204 within storage pool 160. Additionally or alternatively, the FSVMs 170 may present a VFS 202 either to the hypervisor 130 or to user VMs 101 of a host machine 200 to facilitate I/O operations. The FSVMs 170 may access the local storage 122 via Controller/Service VMs 110. As described above with reference to FIG. 1B, a Controller/Service VM 110a may have the ability to perform I/O operations using local storage 122a within the same host machine 200a by connecting via the network 140 to cloud storage 126 or networked storage 128, or by connecting via the network 140 to local storage 122b-c within another host machine 200b-c (e.g., by connecting to another Controller/Service VM 110b-c).

In particular embodiments, each user VM 101 may access one or more virtual disk images 206 stored on one or more disks 204 of the local storage 122, the cloud storage 126, and/or the networked storage 128. The virtual disk images 206 may contain data used by the user VMs 101, such as operating system images, application software, and user data, e.g., user home folders and user profile folders. For example, FIG. 2B illustrates three virtual machine images 206a-c. The virtual machine image 206a may be a file named UserVM101a.vmdisk (or the like) stored on disk 204a of local storage 122a of host machine 200a. The virtual machine image 206a may store the contents of the user VM 101a's hard drive. The disk 204a on which the virtual machine image 206a is "local to" the user VM 101a on host machine 200a because the disk 204a is in local storage 122a of the host machine 200a on which the user VM 101a is located. Thus, the user VM 101a may use local (intra-host machine) communication to access the virtual machine image 206a more efficiently, e.g., with less latency and higher throughput, than would be the case if the virtual machine image 206a were stored on disk 204b of local storage 122b of a different host machine 200b, because inter-host machine communication across the network 140 would be used in the latter case. Similarly, a virtual machine image 206b, which may be a file named UserVM101b.vmdisk (or the like), is stored on disk 204b of local storage 122b of host machine 200b, and the image 206b is local to the user VM 101b located on host machine 200b. Thus, the user VM 101a may access the virtual machine image 206b more efficiently than the virtual machine 206a on host machine 200a, for example. In another example, the CVM 110c may be located on the same host machine 200c as the user VM 101c that accesses a virtual machine image 206c (UserVM101c.vmdisk) of the user VM 101c, with the virtual machine image file 206c being stored on a different host machine 200*b* than the user VM 101*c* and the CVM 110*c*. In this example, communication between the user VM 101*c* and the CVM 110*c* may still be local, e.g., more efficient than communication between the user VM 101*c* and a CVM 110*b* on a different host machine 200*b*, but communication between the CVM 110*c* and the disk 204*b* on which the virtual machine image 206*c* is stored is via the network 140, as shown by the dashed lines between CVM 110*c* and the network 140 and between the network 140 and local storage 122*b*. The communication between CVM 110*c* and the disk 204*b* is not local, and thus may be less efficient than local communication such as may occur between the CVM 110*c* and a disk 204*c* in local storage 122*c* of host machine 200*c*. Further, a user VM 101*c* on host machine 200*c* may access data such as the virtual disk image 206*c* stored on a remote (e.g., non-local) disk 204*b* via network communication with a CVM 110*b* located on the remote host machine 200*b*. This case may occur if CVM 110*c* is not present on host machine 200*c*, e.g., because CVM 110*c* has failed, or if the FSVM 170*c* has been configured to communicate with local storage 122*b* on host machine 200*b* via the CVM 110*b* on host machine 200*b*, e.g., to reduce computational load on host machine 200*c*.

In particular embodiments, since local communication is expected to be more efficient than remote communication, the FSVMs 170 may store storage items, such as files or folders, e.g., the virtual disk images 206, on local storage 122 of the host machine 200 on which the user VM 101 that is expected to access the files is located. A user VM 101 may be expected to access particular storage items if, for example, the storage items are associated with the user VM 101, such as by configuration information. For example, the virtual disk image 206*a* may be associated with the user VM 101*a* by configuration information of the user VM 101*a*. Storage items may also be associated with a user VM 101 via the identity of a user of the user VM 101. For example, files and folders owned by the same user ID as the user who is logged into the user VM 101*a* may be associated with the user VM 101*a*. If the storage items expected to be accessed by a user VM 101*a* are not stored on the same host machine 200*a* as the user VM 101*a*, e.g., because of insufficient available storage capacity in local storage 122*a* of the host machine 200*a*, or because the storage items are expected to be accessed to a greater degree (e.g., more frequently or by more users) by a user VM 101*b* on a different host machine 200*b*, then the user VM 101*a*, may still communicate with a local CVM 110*a* to access the storage items located on the remote host machine 200*b*, and the local CVM 110*a* may communicate with local storage 122*b* on the remote host machine 200*b* to access the storage items located on the remote host machine 200*b*. If the user VM 101*a* on a host machine 200*a* does not or cannot use a local CVM 110*a* to access the storage items located on the remote host machine 200*b*, e.g., because the local CVM 110*a*, has crashed or the user VM 101*a* has been configured to use a remote CVM 110*b*, then communication between the user VM 101*a* and local storage 122*b* on which the storage items are stored may be via a remote CVM 110*b* using the network 140, and the remote CVM 110*b* may access local storage 122*b* using local communication on host machine 200*b*. As another example, a user VM 101*a* on a host machine 200*a* may access storage items located on a disk 204*c* of local storage 122*c* on another host machine 200*c* via a CVM 110*b* on an intermediary host machine 200*b* using network communication between the host machines 200*a* and 200*b* and between the host machines 200*b* and 200*c*.

One of the benefits of a virtualized architecture is the ease of handling increases in load by "scaling up" virtual machines that satisfy a resource usage threshold (e.g., 95% of CPU or memory usage) by allocating additional resources (e.g., CPU or memory), This technique may have its limitations, however, since virtualized resources are ultimately limited by the underlying physical resources. Particular embodiments may augment this technique by "scaling out" once a lower threshold is satisfied (e.g., 75%): creating one or more new FSVMs (and moving one or more volume groups (or any other minimum moveable unit) from heavily loaded FSVMs to being served by the newly created FSVM. Particular embodiments may conversely "scale down" and/ or "scale in" virtual machines in accordance with a resource usage threshold, cluster rules governing a minimum or maximum number of nodes to be permitted in the cluster, cluster rules governing a minimum or maximum number of node resources to be permitted in the cluster, or any other applicable rule governing the number of VFS elements to be permitted in the cluster.

In particular embodiments, a system (VFS 202) for managing data access using a virtualized file server may comprise (1) a plurality of host machines implementing a virtualization environment, wherein each of the host machines comprises a hypervisor and at least one user virtual machine (user VM); and (2) a virtualized file server comprising a plurality of file server virtual machines (FSVMs) and a storage pool comprising a plurality of volume groups, wherein each of the FSVMs is running on one of a subset of the host machines, and wherein each of the FSVMs conduct I/O transactions with their assigned volume groups in the storage pool.

Figure 3A:
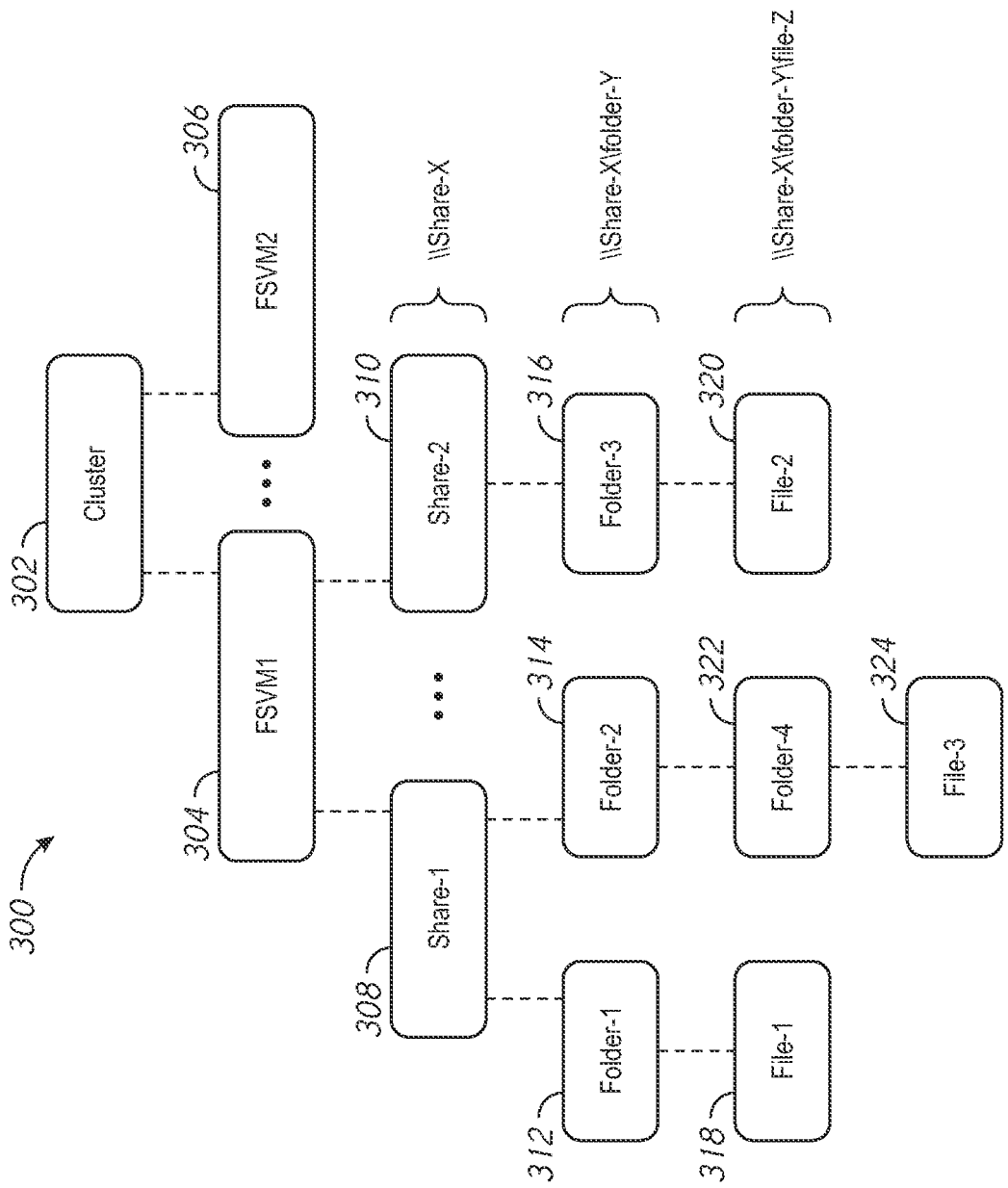
FIG. 3A illustrates an example hierarchical structure 300 of a VFS instance in a cluster according to particular embodiments.
Figure 3B:
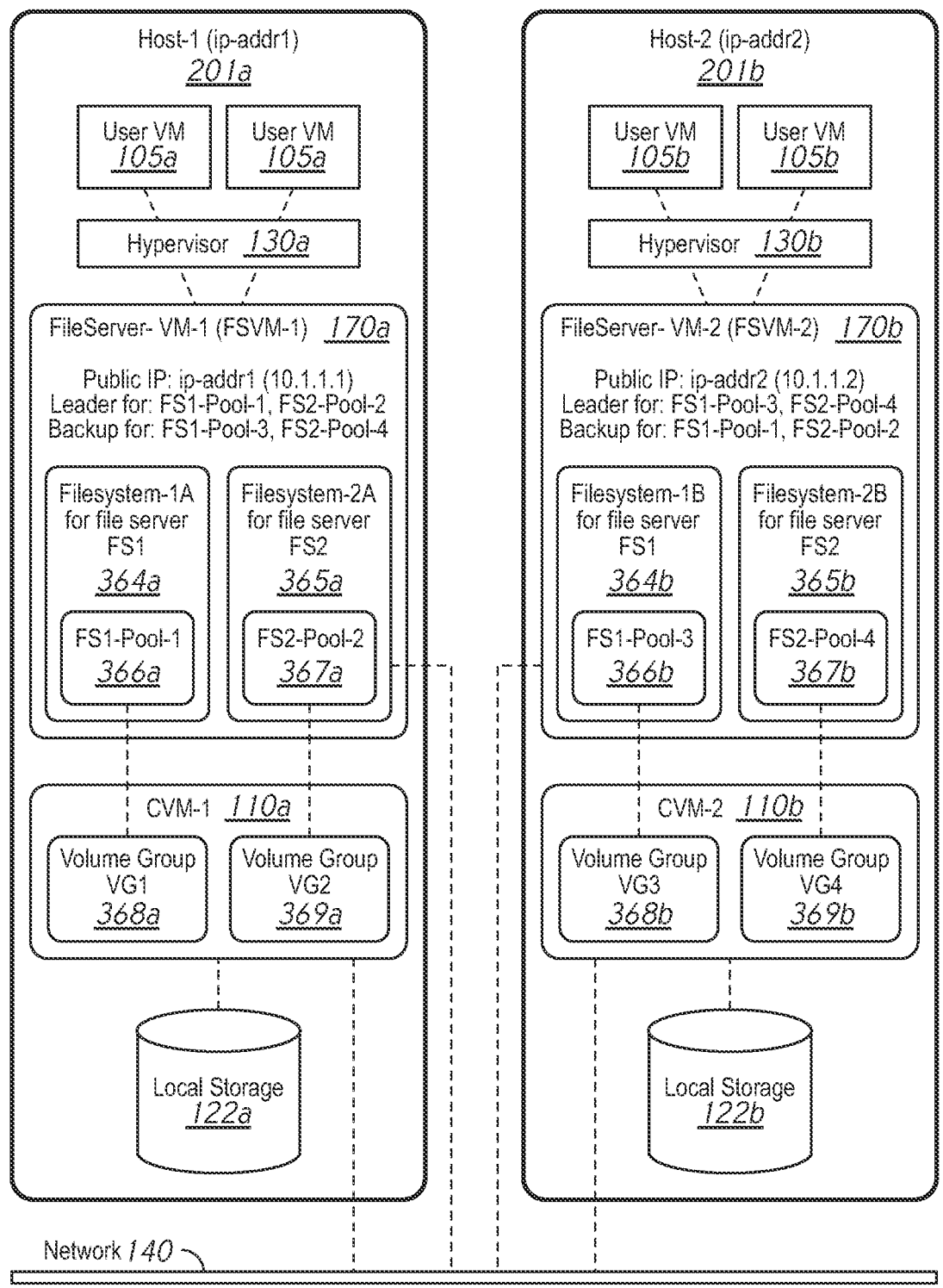
FIG. 3B illustrates two example host machines 200a and 200b, each providing file storage services for portions of two VFS instances FS1 and FS2 according to particular embodiments.

FIG. 3B illustrates two example host machines 200*a* and 200*b*, each providing file storage services for portions of two VFS instances FS1 and FS2 according to particular embodiments. The first host machine, Host-1 200*a*, includes two user VMs 101*a*, 102*a*, a Hypervisor 130*a*, a FSVM named FileServer-VM-1 (abbreviated FSVM-1) 170*a*, a Controller/ Service VM named CVM-1 110*a*, and local storage 122*a*. Host-1's FileServer-VM-1 170*a* has an IP (Internet Protocol) network address of 10.1.1.1, which is an address of a network interface on Host-1 200*a*. Host-1 has a hostname ip-addr1, which may correspond to Host-1's address 10.1.1.1. The second host machine, Host-2 200*b*, includes two user VMs 101*b*, 102*b*, a Hypervisor 130*b*, a File Server VM named FileServer-VM-2 (abbreviated FSVM-2) 170*b*, a Controller/Service VM named CVM-2 110*b*, and local storage 122*b*. Host-2's FileServer-VM-1 170*b* has an IP network address of 10.1.1.2, which is an address of a network interface on Host-2 200*b*.

In particular embodiments, filesystems FileSystem-1A 364*a* and FileSystem-2A 365*a* implement the structure of files and folders for portions of the FS1 and FS2 file server instances, respectively, that are located on (e.g., served by) FileServer-VM-1 170*a* on Host-1 200*a*. Other file systems on other host machines may implement other portions of the FS1 and FS2 file server instances. The filesystems 364*a* and 365*a* may implement the structure of at least a portion of a file server instance by translating file system operations, such as opening a file, writing data to or reading data from the file, deleting a file, and so on, to disk 110 operations such as seeking to a portion of the disk, reading or writing an index of file information, writing data to or reading data from blocks of the disk, allocating or de-allocating the blocks, and so on. The filesystems 364*a*, 365*a* may thus store their filesystem data, including the structure of the folder and file hierarchy, the names of the storage items (e.g., folders and files), and the contents of the storage items on one or more storage devices, such as local storage 122*a*. The particular storage device or devices on which the filesystem data for each filesystem are stored may be specified by an associated filesystem pool (e.g., 366*a-c* and 367*a-c*). For example, the storage device(s) on which data for FileSystem-1A 364*a* and FileSystem-2A, 365*a* are stored may be specified by respective filesystem pools FS1-Pool-1 366*a* and FS2-Pool-2 367*a*. The storage devices for the pool 366*a* may be selected from volume groups provided by CVM-1 110*a*, such as volume group VG1 368*a* and volume group VG2 369*a*. Each volume group 368*a*, 369*a* may include a group of one or more available storage devices that are present in local storage 122*a* associated with (e.g., by iSCSI communication) the CVM-1 110*a*. The CVM-1 110*a* may be associated with a local storage 122*a* on the same host machine 200*a* as the CVM-1 110*a*, or with a local storage 122*b* on a different host machine 200*b*. The CVM-1 110*a* may also be associated with other types of storage, such as cloud storage 126, networked storage 128 or the like. Although the examples described herein include particular host machines, virtual machines, file servers, file server instances, file server pools, CVMs, volume groups, and associations therebetween, any number of host machines, virtual machines, file servers, file server instances, file server pools, CVMs, volume groups, and any associations therebetween are possible and contemplated.

In particular embodiments, the filesystem pool 366*a* may associate any storage device in one of the volume groups 368*a*, 369*a* of storage devices that are available in local storage 122*a* with the filesystem FileSystem-1A 364*a*. For example, the filesystem pool FS1-Pool-1 366*a* may specify that a disk device named hd1 in the volume group VG1 368*a* of local storage 122*a* is a storage device for FileSystem-1A 364*a* for file server FS1 on FSVM-1 170*a*. A filesystem pool FS2-Pool-2 367*a* may specify a storage device FileSystem-2A 365*a* for file server FS2 on FSVM-1 170*a*. The storage device for FileSystem-2A 365*a* may be, e.g., the disk device hd1, or a different device in one of the volume groups 368*a*, 369*a*, such as a disk device named hd2 in volume group VG2 369*a*. Each of the filesystems FileSystem-1A 364*a*, FileSystem-2A 365*a* may be, e.g., an instance of the NTFS file system used by the WINDOWS operating system, of the UFS Unix file system, or the like. The term "filesystem" may also be used herein to refer to an instance of a type of filesystem, e.g., a particular structure of folders and files with particular names and content.

In one example, referring to FIG. 3A, an FS1 hierarchy rooted at File Server FS1 304 may be located on FileServer-VM-1 170*a* and stored in filesystem instance FileSystem-1A 364*a*. That is, the filesystem instance FileSystem-1A 364*a* may store the names of the shares and storage items (such as folders and files), as well as the contents of the storage items, shown in the hierarchy at and below File Server FS1 304. A portion of the FS1 hierarchy shown in FIG. 3A, such the portion rooted at Folder-2 314, may be located on File-Server-VM-2-170*b* on Host-2 200*b* instead of FileServer-VM-1-170*a*, in which case the filesystem instance FileSystem-1B 364*b* may store the portion of the FS1 hierarchy rooted at Folder-2 314, including Folder-3 314, Folder-4 322 and File-3 324. Similarly, an FS2 hierarchy rooted at File Server FS2 306 in FIG. 3A may be located on FileServer-VM-1 170*a* and stored in filesystem instance FileSystem-2A 365*a*. The FS2 hierarchy may be split into multiple portions (not shown), such that one portion is located on FileServer-VM-1 170*a* on Host-1 200*a*, and another portion is located on FileServer-VM-2 170*b* on Host-2 200*b* and stored in filesystem instance FileSystem-2B 365*c*.

In particular embodiments, FileServer-VM-1 (abbreviated FSVM-1) 170*a* on Host-1 200*a* is a leader for a portion of file server instance FS1 and a portion of FS2, and is a backup for another portion of FS1 and another portion of FS2, The portion of FS1 for which FileServer-VM-1 170*a* is a leader corresponds to a storage pool labeled FS1-Pool-1 366*a*, FileServer-VM-1 is also a leader for FS2-Pool-2 367*a*, and is a backup (e.g., is prepared to become a leader upon request, such as in response to a failure of another FSVM) for FS1-Pool-3 366*b* and FS2-Pool-4 367*b* on Host-2. In particular embodiments, FileServer-VM-2 (abbreviated FSVM-2) 170*b* is a leader for a portion of file server instance FS1 and a portion of FS2, and is a backup for another portion of FS1 and another portion of FS2. The portion of FS1 for which FSVM-2 170*b* is a leader corresponds to a storage pool labeled FS1-Pool-3 366*b*. FSVM-2 170*b* is also a leader for FS2-Pool-4 367*b*, and is a backup for FS1-Pool-1 366*a* and FS2-Pool-2 367*a* on Host-1.

In particular embodiments, the file server instances FS1, FS2 provided by the FSVMs 170*a* and 170*b* may be accessed by user VMs 101*a* and 101*b* via a network filesystem protocol such as SMB, CIFS, NFS, or the like. Each FSVM 170*a* and 170*b* may provide what appears to client applications on user VMs 101*a* and 101*b* to be a single filesystem instance, e.g., a single namespace of shares, files and folders, for each file server instance 202. However, the shares, files, and folders in a file server instance such as FS1 may actually be distributed across multiple FSVMs 170*a* and 170*b*. For example, different folders in the same file server instance may be associated with different corresponding FSVMs 170*a* and 170*b* and CVMs 110*a* and 110*b* on different host machines 200*a* and 200*b*.

The example file server instance FS1 304 shown in FIG. 3A has two shares, Share-1 1308 and Share-2 310. Share-1 308 may be located on FSVM-1 170*a*, CVM-1 110*a*, and local storage 122*a*. Network file system protocol requests from user VMs 101 and 102 to read or write data on file server instance FS1 304 and any share, folder, or file in the instance may be sent to FSVM-1 170*a*. FSVM-1 170*a* may determine whether the requested data, e.g., the share, folder, file, or a portion thereof, referenced in the request, is located on FSVM-1, and FSVM-1 is a leader for the requested data. If not, FSVM-1 may respond to the requesting User-VM with an indication that the requested data is not covered by (e.g., is not located on or served by) FSVM-1. Otherwise, the requested data is covered by (e.g., is located on or served by) FSVM-1, so FSVM-1 may send iSCSI protocol requests to a CVM that is associated with the requested data. Note that the CVM associated with the requested data may be the CVM-1 110*a* on the same host machine 200*a* as the FSVM-1, or a different CVM on a different host machine 200*b*, depending on the configuration of the VFS 202. In this example, the requested Share-1 is located on FSVM-1, so FSVM-1 processes the request. To provide for path availability, multipath I/O (MPIO) may be used for communication with the FSVM, e.g., for communication between FSVM-1 and CVM-1. The active path may be set to the CVM that is local to the FSVM (e.g., on the same host machine) by default. The active path may be set to a remote CVM instead of the local CVM, e.g., when a failover occurs.

Continuing with the data request example, the associated CVM is CVM 110*a*, which may in turn access the storage device associated with the requested data as specified in the request, e.g., to write specified data to the storage device or read requested data from a specified location on the storage device. In this example, the associated storage device is in local storage 122*a*, and may be an HDD or SSD. CVM-1 110*a* may access the HDD or SSD via an appropriate protocol, e.g., iSCSI, SCSI, SATA, or the like. CVM 110*a* may send the results of accessing local storage 122*a*, e.g., data that has been read, or the status of a data write operation, to CVM 110*a* via, e.g., SATA, which may in turn send the results to FSVM-1 170*a* via, e.g., iSCSI. FSVM-1 170*a* may then send the results to user VM 101*a* via SMB through the Hypervisor 130*a*.

Share-2 310 may be located on FSVM-2 170*b*, on Host-2. Network file service protocol requests from user VMs 101*a* and 101*b* to read or write data on Share-2 may be directed to FSVM-2 170*b* on Host-2 by other FSVMs 170*a*. Alternatively, user CVMs 101*a* and 101*b* may send such requests directly to FSVM-2 170*b* on Host-2, which may process the requests using CVM-2 110*b* and local storage 122*b* on Host-2 as described above for FSVM-1 170*a* on Host-1.

A file server instance 202 such as FS1 304 in FIG. 3A may appear as a single filesystem instance (e.g., a single namespace of folders and files that are accessible by their names or pathnames without regard for their physical locations), even though portions of the filesystem are stored on different host machines 200*a-c*. Since each FSVM 170 may provide a portion of a file server instance 202, each FSVM 170 may have one or more "local" filesystems 364*a*, 365*a* that provide the portion of the file server instance 202 (e.g., the portion of the namespace of files and folders) associated with the FSVM 170.

Figure 3C:
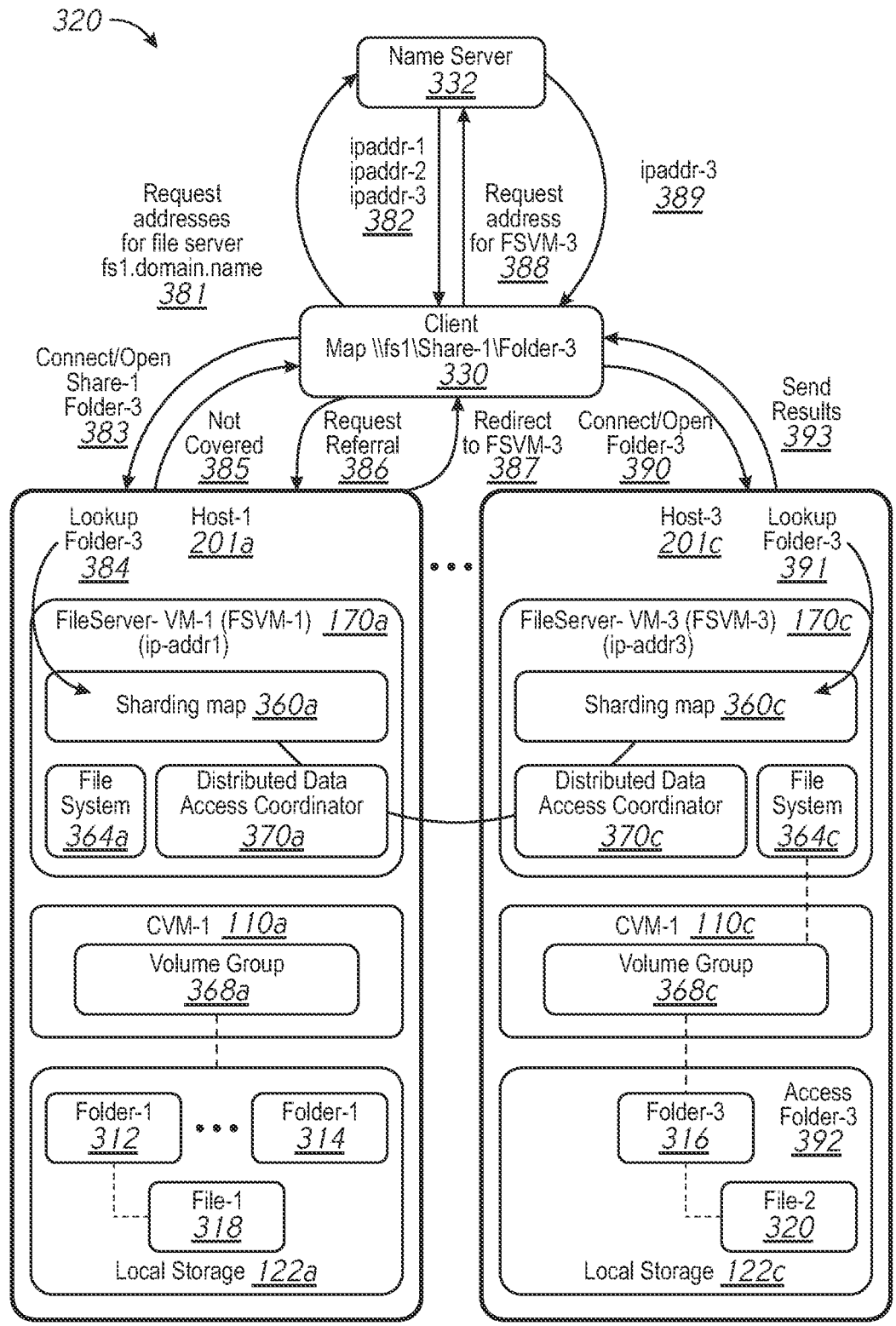
FIG. 3C illustrates example interactions between a client 330 and host machines 200a and 200c on which different portions of a VFS instance are stored according to particular embodiments.

FIG. 3C illustrates example interactions between a client 330 and host machines 200*a* and 200*c* on which different portions of a VFS instance are stored according to particular embodiments. A client 330, e.g., an application program executing in one of the user VMs 101 and 102 on the host machines 200*a-c* of FIGS. 2A-2B (e.g. user VM 101*b* on host machine 200*b*) requests access to a folder \\FS1.domain.name\Share1\Folder-3. The request may be in response to an attempt to map \\FS1.domain.name\Share-1 to a network drive in the operating system executing in the user VM 101*c* followed by an attempt to access the contents of Share-1 or to access the contents of Folder-3, such as listing the files in Folder-3.

FIG. 3C shows interactions that occur between the client 330, FSVMs 170*a* and 170*b* on host machines 200*a* and 200*b*, and a name server 332 when a storage item is mapped or otherwise accessed. The name server 332 may be provided by a server computer system, such as one or more of the host machines 200, or a server computer system separate from the host machines 200. In one example, the name server 332 may be provided by an ACTIVE DIRECTORY service executing on one or more computer systems and accessible via the network 140. The interactions are shown as arrows that represent communications, e.g., messages sent via the network 140. Note that the client 330 may be executing in a user VM 101, which may be co-located with one of the FSVMs 170*a* and 170*b*. In such a co-located case, the arrows between the client 330 and the host machine 200 on which the FSVM 170 is located may represent communication within the host machine 200, and such intra-host machine communication may be performed using a mechanism different from communication over the network 140, e.g., shared memory or inter process communication.

In particular embodiments, when the client 330 requests access to Folder-3, a YES client component executing in the user VM 101*b* may use a distributed file system protocol such as MICROSOFT DFS, or the like, to send the storage access request to one or more of the FSVMs 170*a-c* of FIGS. 2A-2B. To access the requested file or folder, the client determines the location of the requested file or folder, e.g., the identity and/or network address of the FSVM 170 on which the file or folder is located. The client may query a domain cache of FSVM 170*a-c* network addresses that the client has previously identified (e.g., looked up). If the domain cache contains the network address of an FSVM 170 associated with the requested folder name \\FS1.domain.name\Share-1\Folder-3, then the client retrieves the associated network address from the domain cache and sends the access request to the network address, starting at step 393 as described below.

In particular embodiments, at step 381, the client may send a request for a list of addresses of FSVMs 170*a*-170*c* to a name server 332. The name server 332 may be, e.g., a DNS server or other type of server, such as a MICROSOFT domain controller (not shown), that has a database of FSVM addresses. At step 382, the name server 332 may send a reply that contains a list of FSVM 170 network addresses, e.g., ip-addr1, ip-addr2, and ip-addr3, which correspond to the FSVMs 170*a-c* in this example. At step 383, the client 330 may send an access request to one of the network addresses, e.g., the first network address in the list (ip-addr1 in this example), requesting the contents of Folder-3 of Share-1. By selecting the first network address in the list, the particular FSVM 170 to which the access request is sent may be varied, e.g., in a round-robin manner by enabling round-robin DNS (or the like) on the name server 332. The access request may be, e.g., an SMB connect request, an NFS open request, and/or appropriate request(s) to traverse the hierarchy of Share-1 to reach the desired folder or file, e.g., Folder-3 in this example.

At step 384, FileServer-VM-1 170 *a* may process the request received at step 383 by searching a mapping or lookup table, such as a sharding map 360*a*, for the desired folder or file. The map 360 maps stored objects, such as shares, folders, or files, to their corresponding locations, e.g., the names or addresses of FSVMs 170. The map 360 may have the same contents on each host machine 200, with the contents on different host machines being synchronized using a distributed data store as described below. For example, the map 360*a* may contain entries that map Share-1 and Folder-1 to the File Server FSVM-1 170*a*, and Folder-3 to the File Server FSVM-3 170*c*. An example map 360 is shown in Table 1 below.

TABLE 1

| Stored Object | Location |
| --- | --- |
| Folder-1 | FSVM-1 |
| Folder-2 | FSVM-1 |
| File-1 | FSVM-1 |
| Folder-3 | FSVM-3 |
| File-2 | FSVM-3 |

In particular embodiments, the map 360 may be accessible on each of the host machines 200. As described with reference to FIGS. 2A-2B, the maps 360*a* and 360*c* may be copies of a distributed data structure that are maintained and accessed at each FSVM 170*a-c* using a distributed data access coordinator 370*a* and 370*c*. The distributed data access coordinator 370*a* and 370*c* may be implemented based on distributed locks or other storage item access operations. Alternatively, the distributed data access coordinator 370*a* and 370*c* may be implemented by maintaining a master copy of the maps 360*a* and 360*c* at a leader node such as the host machine 200*c*, and using distributed locks to access the master copy from each FSVM 170*a* and 170*b*. The distributed data access coordinator 370*a* and 370*c* may be implemented using distributed locking, leader election, or related features provided by a centralized coordination service for maintaining configuration information, naming, providing distributed synchronization, and/or providing group services (e.g., APACHE ZOOKEEPER or other distributed coordination software). Since the map 360*a* indicates that Folder-3 is located at FSVM-3 170*c* on Host-3 200*c*, the lookup operation at step 384 determines that Folder-3 is not located at FSVM-1 on Host-1 200*a*. Thus, at step 385 the FSVM-1 170*a* sends a response, e.g., a "Not Covered" DFS response, to the client 330 indicating that the requested folder is not located at FSVM-1. At step 386, the client 330 sends a request to FSVM-1 for a referral to the FSVM on which Folder-3 is located. FSVM-1 uses the map 360*a* to determine that Folder-3 is located at FSVM-3 on Host-3 200*c*, and at step 387 returns a response, e.g., a "Redirect" DFS response, redirecting the client 330 to FSVM-3. The client 330 may then determine the network address for FSVM-3, which is ip-addr3 (e.g., a host name "ip-addr3.domain.name" or an IP address, 10.1.1.3). The client 330 may determine the network address for FSVM-3 by searching a cache stored in memory of the client 330, which may contain a mapping from FSVM-3 to ip-addr3 cached in a previous operation. If the cache does not contain a network address for FSVM-3, then at step 388 the client 330 may send a request to the name server 332 to resolve the name FSVM-3. The name server may respond with the resolved address, ip-addr3, at step 389. The client 330 may then store the association between FSVM-3 and ip-addr3 in the client's cache.

In particular embodiments, failure of FSVMs 170 may be detected using the centralized coordination service. For example, using the centralized coordination service, each FSVM 170*a* may create a lock on the host machine 200*a* on which the FSVM 170*a* is located using ephemeral nodes of the centralized coordination service (which are different from host machines 200 but may correspond to host machines 200). Other FSVMs 170*b* and 170*c* may volunteer for leadership of resources of remote FSVMs 170 on other host machines 200, e.g., by requesting a lock on the other host machines 200. The locks requested by the other nodes are not granted unless communication to the leader host machine 200*c* is lost, in which case the centralized coordination service deletes the ephemeral node and grants the lock to one of the volunteer host machines 200*a* and 200*b*, which becomes the new leader. For example, the volunteer host machines 200*a* and 200*b* may be ordered by the time at which the centralized coordination service received their requests, and the lock may be granted to the first host machine 200 on the ordered list. The first host machine 200 (e.g., host machine 200*b*) on the list may thus be selected as the new leader. The FSVM 170*b* on the new leader has ownership of the resources that were associated with the failed leader FSVM 170*a* until the failed leader FSVM 170*c* is restored, at which point the restored FSVM 170*a* may reclaim the local resources of the host machine 200*c* on which it is located.

At step 390, the client 330 may send an access request to FSVM-3 170*c* at ip-addr3 on Host-3 200*c* requesting the contents of Folder-3 of Share-1. At step 391, FSVM-3 170*c* queries FSVM-3's copy of the map 360 using FSVM-3's instance of the distributed data access coordinator 370*c*. The map 360 indicates that Folder-3 is located on FSVM-3, so at step 392 FSVM-3 accesses the file system 364*c* to retrieve information about Folder-3 316 and its contents (e.g., a list of files in the folder, which includes File-2 320) that are stored on the local storage 122*c*. FSVM-3 may access local storage 122*c* via CVM-3 110*c*, which provides access to local storage 122*c* via a volume group 368*c* that contains one or more volumes stored on one or more storage devices in local storage 122*c*. At step 393, FSVM-3 may then send the information about Folder-3 and its contents to the client 330. Optionally, FSVM-3 may retrieve the contents of File-2 and send them to the client 330, or the client 330 may send a subsequent request to retrieve File-2 as needed.

Figure 4A:
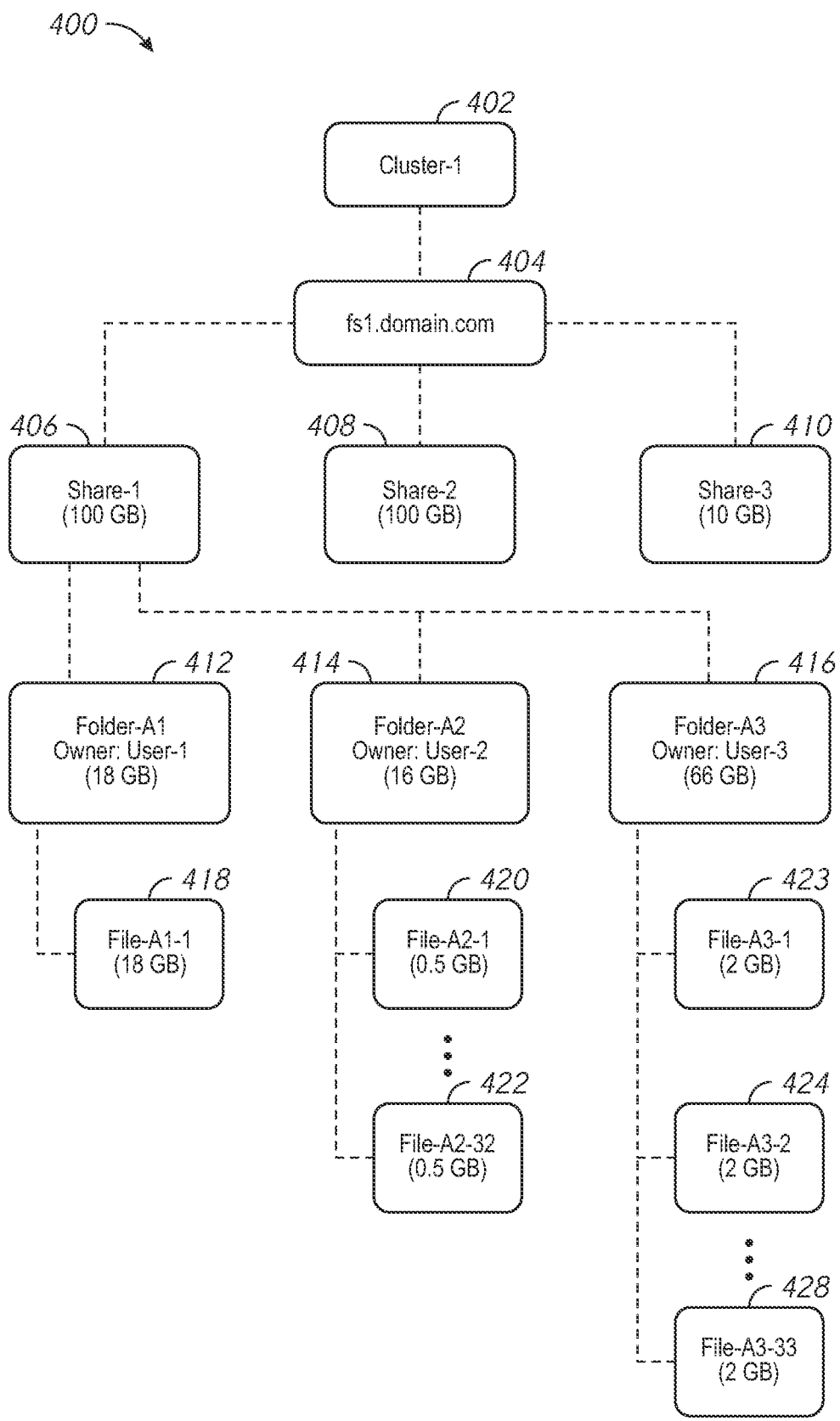
FIGS. 4A and 4B illustrate an example hierarchical namespace 400 of a file server according to particular embodiments.
Figure 4B:
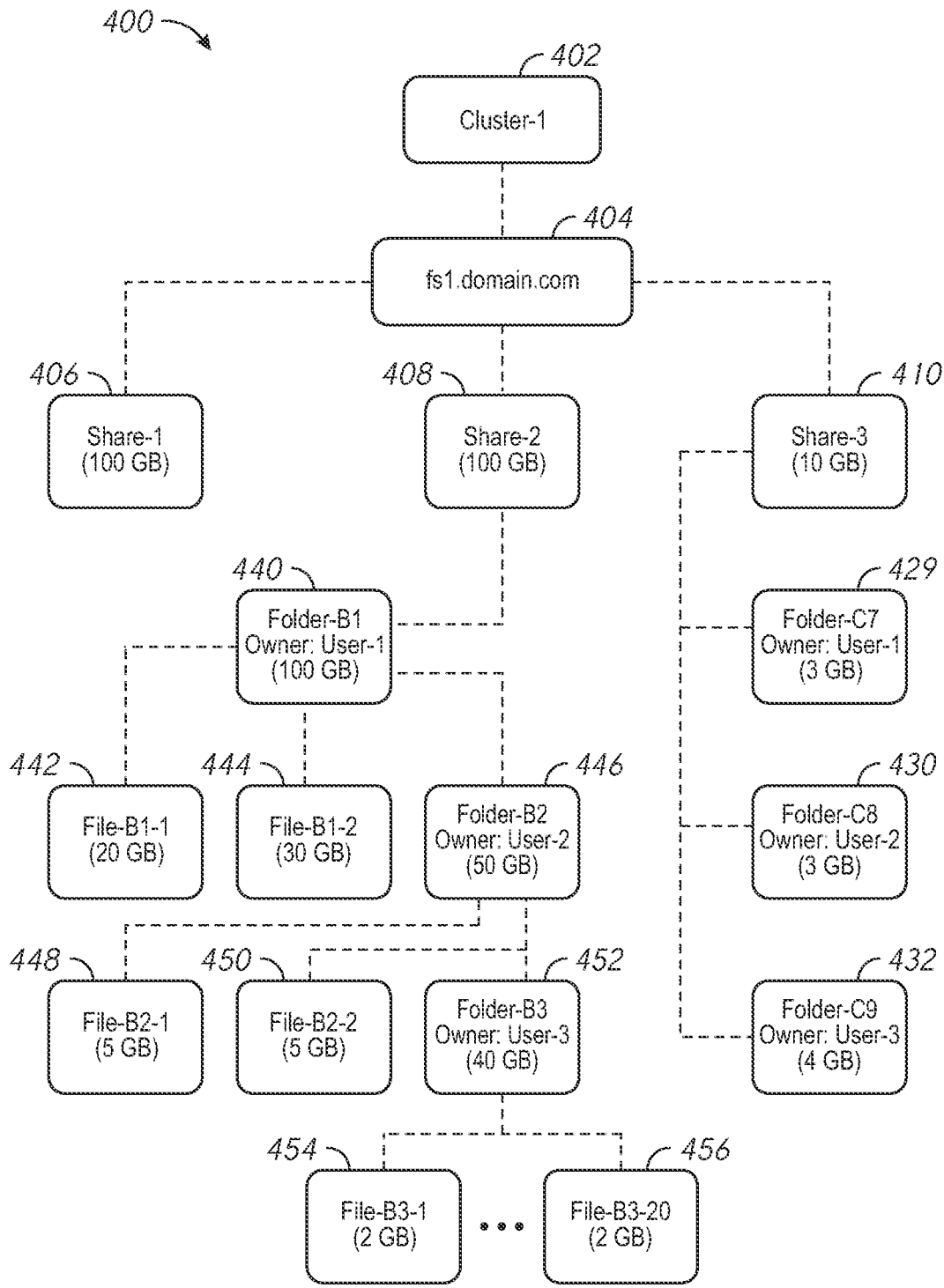

FIGS. 4A and 4B illustrate an example hierarchical namespace 400 of a file server according to particular embodiments. Cluster-1 402 is a cluster, which may contain one or more file server instances, such as an instance named FS1.domain.com 404. Although one cluster is shown in FIGS. 4A and 4B, there may be multiple clusters, and each cluster may include one or more file server instances. The file server FS1.domain.com 404 contains three shares: Share-1 406, Share-2 408, and Share-3 410. Share-1 may be a home directory share on which user directories are stored, and Share-2 and Share-3 may be departmental shares for two different departments of a business organization, for example. Each share has an associated size in gigabytes, e.g., 100 Gb (gigabytes) for Share-1, 100 Gb for Share-2, and 10 Gb for Share-3. The sizes may indicate a total capacity, including used and free space, or may indicate used space or free space. Share-1 includes three folders, Folder-A1 412, Folder-A2 414, and Folder-A3 416. The capacity of Folder-A1 is 18 Gb, Folder-A2 is 16 Gb, and Folder-A3 is 66 Gb. Further, each folder is associated with a user, referred to as an owner. Folder-A1 is owned by User-1, Folder-A2 by User-2, and Folder-A3 by User-3. Folder-A1 contains a file named File-A1-1 418, of size 18 Gb. Folder-A2 contains 32 files, each of size 0.5 Gb, named File-A2-1 420 through File-A2-32 422. Folder-A3 contains 33 files, each of size 2 Gb, named File-A3-1 423 and File-A3-2 424 through File-A3-33 426.

FIG. 4B shows the contents of Share-2 408 and Share-3 410 of FS1.domain.com 404. Share-2 contains a folder named Folder-B1 440, owned by User-1 and having a size of 100 Gb. Folder-B1 contains File-B1-1 442 of size 20 Gb, File-B1-2 444 of size 30 Gb, and Folder-B2 446, owned by User-2 and having size 50 Gb. Folder-B2 contains File-B2-1 448 of size 5 Gb, File-B2-2 450 of size 5 Gb, and Folder-B3 452, owned by User-3 and having size 40 Gb. Folder-B3 452 contains 20 files of size 2 Gb each, named File-B3-1 454 through File-B3-20 456. Share-3 contains three folders: Folder-C7 429 owned by User-1 of size 3 Gb, Folder-C8 430 owned by User-2 of size 3 Gb, and Folder-C9 432 owned by User-3 of size 4 Gb.

Figure 4C:
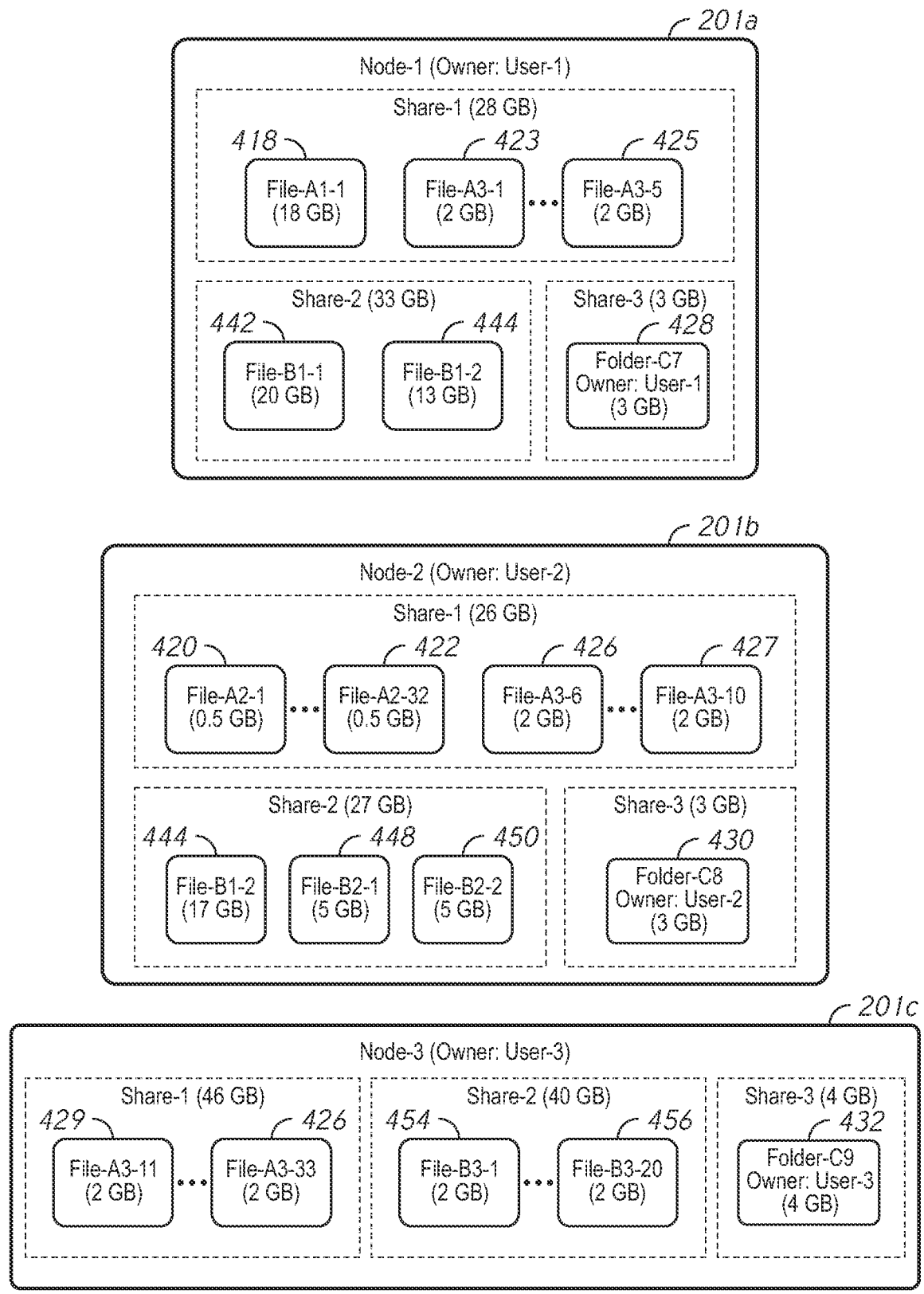
FIG. 4C illustrates distribution of stored data amongst host machines in a virtualized file server according to particular embodiments.

FIG. 4C illustrates distribution of stored data amongst host machines in a virtualized file server according to particular embodiments. In the example of FIG. 4C, the three shares are spread across three host machines 200*a-c*. Approximately one-third of each share is located on each of the three FSVMs 170. For example, approximately one-third of Share-3's files are located on each of the three FSVMs 170*a-c*. Note that from a user's point of a view, a share looks like a directory. Although the files in the shares (and in directories) are distributed across the three host machines 200*a-c*, the VFS 202 provides a directory structure having a single namespace in which client executing on user VMs 101 and 102 may access the files in a location-transparent way, e.g., without knowing which host machines store which files (or which blocks of files).

In the example of FIG. 4C, Host-1 stores (e.g., is assigned to) 28 Gb of Share-1, including 18 Gb for File-A1-1 418 and 2 Gb each for File-A3-1 423 through File-A3-5 425, 33 Gb of Share-2, including 20 Gb for File-B1-1 and 13 Gb for File-B1-2, and 3 Gb of Share-3, including 3 Gb of Folder-C7. Host-2 stores 26 Gb of Share-1, including 0.5 Gb each of File-A2-1 420 through file-A2-32 422 (16 Gb total) and 2 Gb each of File-A3-6 426 through File-A3-10 427 (10 Gb total), 27 Gb of Share-2, including 17 Gb of File-B1-2, 5 Gb of File-B2-1, and 5 Gb of File-B2-2, and 3 Gb of Share-3, including 3 Gb of Folder-C8, Host-3 stores 46 Gb of Share-1, including 2 Gb each of File-A3-11 429 through File-A3-33 428 (66 Gb total), 40 Gb of Share-2, including 2 Gb each of File-B3-1 454 through File-B3-20 456, and Share-3 stores 4 Gb of Share-3, including 4 Gb of Folder-C9 432.

In particular embodiments, a system for managing communication connections in a virtualization environment includes a plurality of host machines implementing a virtualization environment. Each of the host machines includes a hypervisor and at least one user virtual machine (user VM) 101. The system may also include a connection agent, an I/O controller, and/or a virtual disk comprising a plurality of storage devices. The virtual disk may be accessible by all of the I/O controllers, and the I/O controllers may conduct I/O transactions with the virtual disk based on I/O requests received from the user VMs 101. The I/O requests may be, for example, requests to perform particular storage access operations such as list folders and files in a specified folder, create a new file or folder, open an existing file for reading or writing, read data from or write data to a file, as well as file manipulation operations to rename, delete, copy, or get details, such as metadata, of files or folders. Each I/O request may reference, e.g., identify by name or numeric identifier, a file or folder on which the associated storage access operation is to be performed. The system further includes a virtualized file server, which includes a plurality of FSVMs 170 and associated local storage 122. Each FSVM 170 and associated local storage device 122 is local to a corresponding one of the host machines 200. The FSVMs 170 conduct I/O transactions with their associated local storage 122 based on I/O requests received from the user VMs 101. For each one of the host machines 200, each of the user VMs 101 on the one of the host machines 200 sends each of its respective I/O requests 383 to a selected one of the FSVMs 170, which may be selected based on a lookup table 360, e.g., a sharding map, that maps a file 318, folder 312, or other storage resource referenced by the I/O request to the selected one of the FSVMs 170).

In particular embodiments, the initial FSVM to receive the request from the user VM may be determined by selecting any of the FSVMs 170 on the network 140, e.g., at random, by round robin selection, or by a load-balancing algorithm, and sending an I/O request 383 to the selected FSVM 170 via the network 140 or via local communication within the host machine 200. Local communication may be used if the file 318 or folder 412 referenced by the I/O request is local to the selected FSVM, e.g., the referenced file or folder is located on the same host machine 200 as the selected FSVM 170. In this local case, the I/O request 383 need not be sent via the network 140. Instead, the I/O request 383 may be sent to the selected FSVM 170 using local communication, e.g., a local communication protocol such as UNIX domain sockets, a loopback communication interface, inter-process communication on the host machine 200, or the like. The selected FSVM 170 may perform the I/O transaction specified in the I/O request and return the result of the transaction via local communication. If the referenced file or folder is not local to the selected FSVM, then the selected FSVM may return a result indicating that the I/O request cannot be performed because the file or folder is not local to the FSVM. The user VM may then submit a REFERRAL, request or the like to the selected FSVM, which may determine which FSVM the referenced file or folder is local to (e.g., by looking up the FSVM in a distributed mapping table), and return the identity of that FSVM to the user VM in a REDIRECT response or the like. Alternatively, the selected FSVM may determine which FSVM the referenced file or folder is local to, and return the identity of that FSVM to the user VM in the first response without the REFERRAL and REDIRECT messages. Other ways of redirecting the user VM to the FSVM of the referenced file are contemplated. For example, the FSVM that is on the same host as the requesting user VM (e.g., local to the requesting user VM) may determine which FSVM the file or folder is local to, and inform the requesting user VM of the identity of that FSVM without communicating with a different host.

In particular embodiments, the file or folder referenced by the I/O request includes a file server name that identifies a virtualized file server on which the file or folder is stored. The file server name may also include or be associated with a share name that identifies a share, file system, partition, or volume on which the file or folder is stored. Each of the user VMs on the host machine may send a host name lookup request, e.g., to a domain name service, that includes the file server name, and may receive one or more network addresses of one or more host machines on which the file or folder is stored.

In particular embodiments, as described above, the FSVM may send the I/O request to a selected one of the FSVMs. The selected one of the FSVMs may be identified by one of the host machine network addresses received above. In one aspect, the file or folder is stored in the local storage of one of the host machines, and the identity of the host machines may be determined as described below.

In particular embodiments, when the file or folder is not located on storage local to the selected FSVM, e.g., when the selected FSVM is not local to the identified host machine, the selected FSVM responds to the I/O request with an indication that the file or folder is not located on the identified host machine. Alternatively, the FSVM may look up the identity of the host machine on which the file or folder is located, and return the identity of the host machine in a response.

In particular embodiments, when the host machine receives a response indicating that the file or folder is not located in the local storage of the selected FSVM, the host machine may send a referral request (referencing the I/O request or the file or folder from the I/O request) to the selected FSVM. When the selected FSVM receives the referral request, the selected FSVM identifies one of the host machines that is associated with a file or folder referenced in the referral request based on an association that maps files to host machines, such as a sharding table (which may be stored by the centralized coordination service). When the selected FSVM is not local to the host machine, then the selected FSVM sends a redirect response that redirects the user VM on the host machine to the machine on which the selected. FSVM is located. That is, the redirect response may reference the identified host machine (and by association the selected second one of the FSVMs). In particular embodiments, the user VM on the host machine receives the redirect response and may cache an association between the file or folder referenced in the I/O request and the host machine referenced in the redirect response.

In particular embodiments, the user VM on the host machine may send a host name lookup request that includes the name of the identified host machine to a name service, and may receive the network address of the identified host machine from the name service. The user VM on the host machine may then send the I/O request to the network address received from the name service. The FSVM on the host machine may receive the I/O request and performs the I/O transaction specified therein. That is, when the FSVM is local to the identified host machine, the FSVM performs the I/O transaction based on the I/O request. After performing or requesting the I/O transaction, the FSVM may send a response that includes a result of the I/O transaction back to the requesting host machine. I/O requests from the user VM may be generated by a client library that implements file I/O and is used by client program code (such as an application program).

Figure 5:
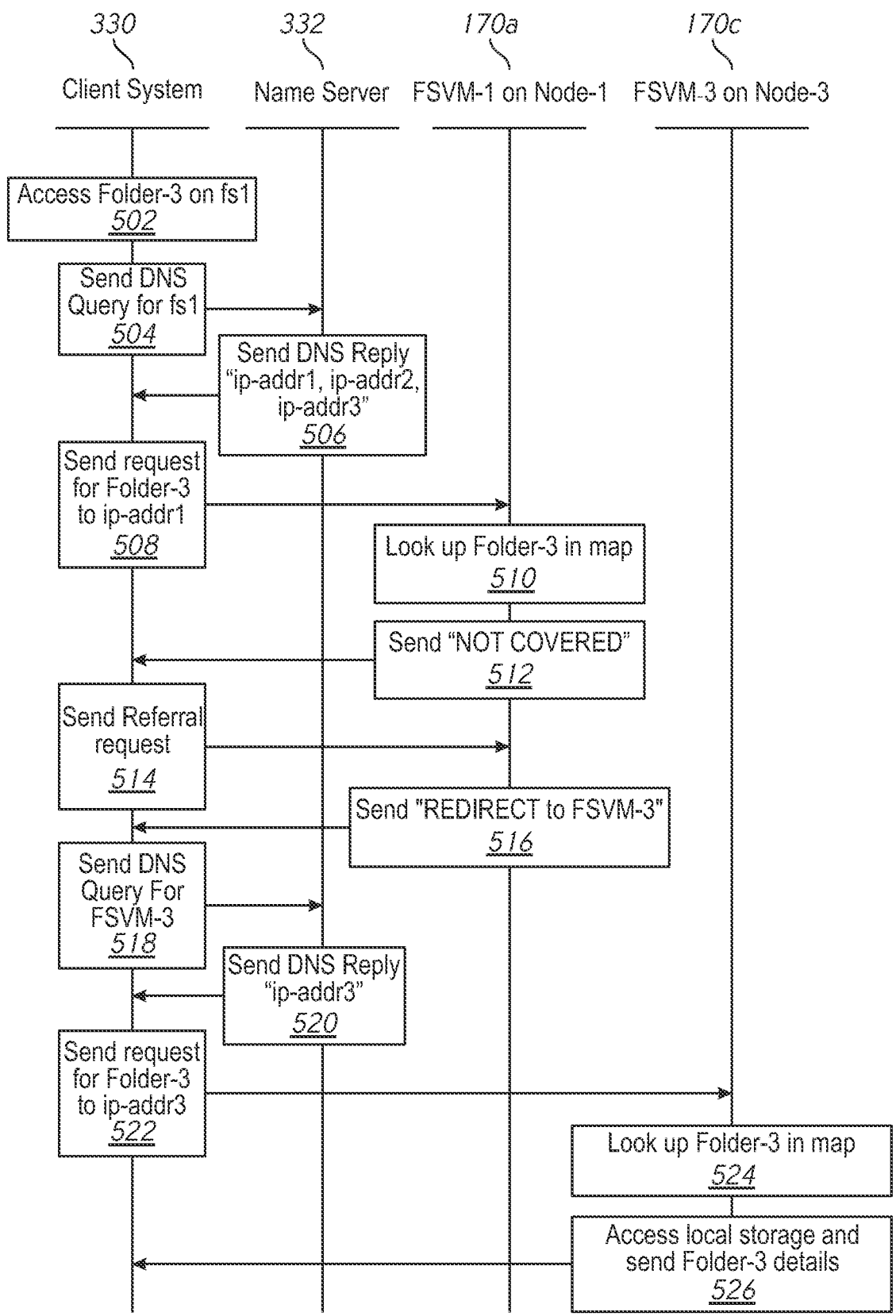
FIG. 5 illustrates an example method for accessing data in a virtualized file server according to particular embodiments.

FIG. 5 illustrates an example method for accessing data in a virtualized file server according to particular embodiments. The client system 330 may access the data, such as a specified folder, as follows. At step 502, the client system 330 receives a storage access request from an application executing in a user VM. Each storage access request references a file path (e.g., \\FS1.share.com\share-1\Folder-1), which includes a file or folder name and further includes or can be used to identify a share name (e.g., FS1.share.com\share-1) or an NFS remote file system name (e.g., fs1.share.com/share-1. The storage access request may also include an operation type (e.g., read, write, delete, rename, etc.), a position in the file (for read/write requests), data to be written (for write requests), quantity of data to be read (for read requests), a new file path (for rename requests), folder name (for folder creation requests) or other information appropriate for the operation type. At step 504, the client system may send a DNS query request for the file server portion of the share name (e.g., \\fs1.domain.com for the share \\FS1.domain.com\share-1) to a name server 332, which may return the identity of a selected host machine as a result. The name server 332 may be a DNS server. The selected host machine is not necessarily the host machine on which the file or folder itself is located, however, since the share may be distributed amongst multiple host machines, one of which actually stores the file or folder. In particular embodiments, a FSVM each host machine can determine which host machine a file is stored on, and, if a FSVM receives a request for a file stored on a different host machine, the FSVM sends a referral response that includes the identity of the host machine on which the file is stored.

At step 506, the name server 332 may respond to the client with an IP (network) address of one or more host machines on FSVMs for the file or folder may be located. For example, the DNS server entry FS1.domain.com includes entries for FSVM-1, FSVM-2, and FSVM-3, which are, respectively, ip-addr1, ip-addr2, ip-addr3 (or 10.1.1.1, 10.1.1.2, 10.1.1.3). One of these three example IP addresses may be selected by the DNS server and returned in a response. In one example, the DNS server returns the three IP addresses in a different permutation for each request using DNS round robin so that a different server may be selected by the client for each request to balance the request load among the three servers. In this example, ip-addr1 (10.1.1.1) is the first address in the list sent in the reply to the client 330, and so is selected by the client as the address to which the I/O request will, at least initially, be sent. At step 508, the client may send the I/O request to access the folder "Folder-3" to the FSVM located on the host machine having address ip-addr1. The I/O request may be, e.g., a DFS attach or connect request, an NFS open request, or the like.

At step 510, FSVM-1 170a on Host-1 200a receives the I/O request and consults a map or lookup table, such as the sharding map 360a, to determine whether the folder "Folder-3" is stored on a locally-attached storage resource of the host machine on which FSVM 170a is located. If so, FSVM 170a performs executes step 567 to perform the I/O transaction identified by the I/O request. If not, at step 512 FSVM-1 170a responds to the client 330 with an indication that the folder is not located on the FSVM-1 170a's host machine 200a. The indication may be, e.g., a PATH_NOT_COVERED DFS response. At step 514, upon receiving the indication that the file is not located on the FSVM 170a to which the request was sent, the client 330 sends a DFS REFERRAL request to FSVM 170a, requesting a referral to the FSVM on which "Folder-3" is stored. At step 545, FSVM 170a receives the REFERRAL request and sends a DFS "REDIRECT to FSVM-3" response back to the client 330. FSVM 170a looks up the FSVM on which the folder "Folder-3" is stored in the map 360a that associates files or shares with host machines. The result of the lookup, FSVM-3 170c, may have been determined previously by the lookup at step 510 when the initial request for Folder-3 was received, or may be determined at step 516 when the referral request for Folder-3 is received. For example, the map 360a may be stored in a shared data structure provided by the centralized coordination service, and the lookup may be performed by accessing the shared data structure. In this example, the file or folder is "Folder-3" and map indicates that the folder is associated with FSVM 170c, so at step 516 FSVM 170a may send a REDIRECT response to the client indicating that the requested folder is stored on host machine 200c (on which FSVM 170c is located). The REDIRECT response may reference the host machine 200c, the FSVM 170c, the network address of host machine 200c (e.g., ip-addr3, in which case steps 518 and 520 may not be necessary), or other identifier for the location of the requested folder. The client 330 may receive the REDIRECT response and cache the association between Folder-3 and host machine 200c (and/or FSVM 170c) for potential future use.

At step 518, the client 330 may send a DNS query request to the DNS server 332 to determine the IP address of the FSVM specified in the received REDIRECT response, which is FSVM 170c having IP address ip-addr3 in this example. At step 520, the DNS server 332 may send a reply to the client 330 indicating the IP address of the requested host machine. For example, the reply may be ip-addr3 (or 10.1.1.3), which is the IP address of FSVM 170c. At step 522, the client sends the I/O request to access Folder-3 to the IP address received in the DNS reply (e.g., ip-addr3). At step 524, the FSVM 170c on host machine 200c receives the I/O request that references Folder-3 and looks up Folder-3 in the sharding map. At step 526, FSVM 170c performs the requested I/O transaction for Folder-3, e.g., by accessing local storage 122c, and sends the results of the access, e.g., details about Folder-3 in this example, such as a list of files and associated metadata, back to the client 330 in an I/O response. The client 330 receives the I/O response and may pass the results of the I/O transaction to the application or other program code that requested the access. Any subsequent requests for the same data (Folder-3 in this example) by the client 330 may be sent directly to host machine 200c on which the data is stored because the client 330 may use the cached identity of the host machine or FSVM on which the data is stored. Although data contained in a folder is accessed in the example of FIG. 5, other types of data may be accessed similarly, e.g., data contained in files.

In particular embodiments, a virtual appliance may be deployed by using a hypervisor-agnostic bootable image in a variety of hypervisor environments. The image may be provided for download from a portal website to a hypervisor storage container. The hypervisor-agnostic image may then be converted into a native image that is specific to the hypervisor platform. Using the native image, VMs are then created and configured on the hypervisor, network and storage configuration is completed. Finally, the VMs may be grouped into a cluster in order to provide a virtualized service in the form of an appliance. The hypervisor-agnostic bootable image itself may have been compressed and prepended with headers providing instructions regarding how to perform conversion of the hypervisor-agnostic bootable image into the native image.

In particular embodiments, a VFS 202 consists of multiple compute units, e.g., FSVMs 170. These FSVMs 170 act as a single VFS 202 to the outside world. Clusters with appropriate platforms and licenses use a hypervisor-agnostic code-image for the VFS 202. This image may be stored as part of pre-created, ready to use disk images. When a user with correct privileges decides to create a VFS 202, the image may be cloned N times, where N is the number of FSVMs 170, and the FSVMs 170 are created. The FSVMs 170 form a cluster, which may provide a VFS 202 to the outside world. In this way, the user is abstracted from the complex process of deploying the VFS 202, as the input requested from the user is a small number of parameters that can be provided by the user in a simple user interface. The pre-created fileserver image may reduce the deployment time to be as fast as booting the host machines 200.

In particular embodiments, the VFS comprises multiple FSVMs 170. The host machines 200 may combine to act as VFS 202 to the outside world. Each host machine 200 may have two types of vdisks: code and data. The operating system (OS) code and file server code reside on the code vdisk. The fileserver persistent data and configuration are stored on the data vdisk. In a first technique for upgrading the VFS 202, before the upgrade process is started, the newer version of the code disk is prepared and cloned N times (where N is the number of FSVMs 170). While upgrading the VFS 202 to the latest version, a new code disk is swapped with the existing code disk for each FSVM 170. After rebooting the FSVM 170, it will be running with newer code, and continues serving the data using the newer code.

In particular embodiments, in a second technique for upgrading the VFS 202, before the upgrade process is started and after the newer version of the code disk is prepared and cloned, a first FSVM 170a acquires an upgrade token, swaps the old code disk with the newer disk, and reboots. When the first FSVM 170a comes back up and is running, the upgrade token is passed to the next FSVM 170b, which may perform the swap and reboot, and pass the upgrade token to the next FSVM 170c. These operations are repeated until the last FSVM 170, e.g., FSVM 170c in this example, is upgraded. During the time that each FSVM 170b is being rebooted, one of the peer FSVMs 170a takes over the storage and IP address of the FSVM 170b so that the client does not see any interruption in the file service.

In particular embodiments, users dealing with Virtual Disk Image ("VIM") files and their corresponding root directories are, by definition, bound to their VMs. This binding provides a user VM 101 to root-level directory mapping. A sharding algorithm may determine a mapping between a user VM 101 and its corresponding host machine 200. This mapping may in turn provide a root-level directory-to-host machine mapping. The sharding algorithm may use this mapping and add metadata to keep storage units and compute units local, e.g., located on, the same host machine. On migration of the user virtual machines 102, metadata and storage will be moved accordingly.

Particular embodiments may provide enhanced performance via adaptive data and compute-unit migration. Particular embodiments may provide the ability to restrict compute units and storage units to a location governed by user policy.

In particular embodiments, data migration from an existing VFS 202 to a new VFS 202 may be bounded by the speed of connection between the existing infrastructure (e.g., host machines 200) and the new system (e.g., other host machines). By using smart data ingestion, data migration speed can be increased with a multiplier of the number of file server host machines.

In previous approaches, data is migrated using a utility to copy data from one source to one target location. Migration speed is limited by the connection speed. In particular embodiments, using the smart data ingestion approach described herein, top-level directories in an existing VFS 202 are preprocessed to acquire the destination host machine 200 on a new (destination) VFS 202. When data migration begins, each host machine 200 in the VFS 202 starts data migration with the share directories assigned, which speeds up data migration with a multiplier of host machine count. By taking advantage of the distributed nature of the VFS 202, data migration is performed in parallel to speed up the migration process. Using the same sharding algorithm as file I/O to decide the migration target ensure the consistency of migrated data placement in, e.g., the new (destination) VFS 202. In particular embodiments, no further processing is needed after data is migrated, and data is ready to be served.

In a first example, when the organization that manages a virtualized file server instance (VFS) 202 decides to, for example, segregate the existing VFS 202 to a departmental level, the VFS 202 may be split into multiple virtualized file server instances (VFSs) 202 without affecting the stored data, with zero to minimal down time, and with zero data copying or migration. In a second example, when an organization that manages multiple VFSs 202 decides to merge them into one manageable VFS 202, the multiple VFSs 202 may be merged together without affecting the stored data, and with zero to minimal down time and zero data copying or migration. When an organization needs to merge multiple VFSs 202, then a system administrator may deploy a new VFS 202 and migrate the stored data from the multiple VFSs 202 to the newly deployed VFS 202, which takes more time and resources. When the organization needs to split the VFS 202, then a system administrator may deploy new VFSs 202 and migrate the data from the old VFS 202 to the newly deployed VFSs 202, which also takes more time and resources.

In particular embodiments, the splitting and merging operations may be performed as follows. To split an existing VFS 202, e.g., upon a system administrator's request, the following operations may be performed:
  1. Select the FSVMs 170 to be segregated from VFS 202.
  2. The FSVMs 170 are removed one by one.
  3. Before removing a FSVM 170 from the VFS 202, first select a lightly loaded FSVM 170 and voluntarily relinquish the storage resources to the selected FSVM 170. The IP address of the FSVM 170 being removed may also be moved to the selected FSVM 170 to retain SMB client connections.

4. After removing all the FSVMs 170 from the VFS 202, a new VFS 202 is constructed.
5. The FSVMs 170 of the new VFS 202 join the domain and start serving the new shares. Old shares may still be served by the old VFS 202. Once the administrator decides to move the old shares to the new VFS 202, trigger a storage transition that relinquishes the storage to the appropriate selected FSVMs 170 and move the IP addresses of FSVMs 170 of the old VFS 202 to FSVMs 170 of the new VFS 202.
6. The same process may be continued to segregate other VFSs 202.

In particular embodiments, to merge multiple VFSs 202 together, e.g., upon a system administrator's request, an election is triggered between the multiple VFSs 202 based on the virtual IP address or based on preference policies. The VFS 202 that wins the election or is selected by an administrator is treated as a master VFS. All other VFSs then join to the master VFS's ACTIVE DIRECTORY domain. FSVMs 170 from all slave VFSs 202 may be added to the master VFS 202, and storage pool metadata of the slave VFSs 202 is modified to serve for the master VFS 202. The following operations may be performed to merge the slave VFSs into the master VFS:

1. Select the VFSs 202 to be merged.
2. Initiate the election to elect the master VFS 202 based on the policy of the VFS 202 that has the higher IP address.
3. Once the master VFS has been selected, clients connect to it.
4. Select a slave VFS to merge.
5. Relinquish the storage to a lightly-loaded FSVM on the master VFS and move the IP address to refer to the lightly-loaded FSVM.
6. Start serving SMB clients for new and old shares.
7. Stop the slave file server, add its FSVM(s) one by one to the new master file server, and take back its resource on the new master file server.
8. Continue these steps for other slave file servers.

In scenarios such as a company splitting into multiple companies, it could be a requirement that a single VFS 202 is split into two VFSs 202. However, there may be certain SAMBA shares in the original VFS 202 that need to be made accessible to both the VFSs 202. As an example, consider two different fileservers FS1 and FS2. FS1 originally hosted a share 'share1'. FS2 needs the ability to read/write to the share 'share1'. The SMB requests for 'share1' on FS2 may be forwarded or proxied to FS1, thereby allowing the share 'share1' to be readable/writable from two different VFSs 202. Another approach is to NFS-mount the original share on the new VFS 202, to provide a single namespace. The ability to selectively choose certain shares to be shared across other VFSs 202 ensures a tight security boundary at the VFS level, along with the collaborative access via two different VFSs.

In particular embodiments, disaster recovery of the VFS 202 may be performed by making backups and replicating delta changes in a storage layer, then recovering the data stored in the VFS 202 at a remote site. The data may be recovered by reconstructing the VFS 202 from a replicated configuration. In a production environment, the data stored on a VFS 202 is securely protected and restored on a remote location without loss of the data and metadata within a supported Recovery Point Objective (which may be the age of files to be recovered from backup storage for normal operations to resume). A custom replication policy may be configured for the VFS 202, and the ability may be provided to map the VFS 202's configuration between sites to provide disaster recovery of virtual file-services across geographical locations. Particular embodiments may provide the ability to protect individual shares or share groups by protecting the volume group(s) used for file-services storage, e.g., by adding them to a protection domain. Users may apply the replication and backup policies on the protection domain to configure the Recovery Point Objective, recovery sites (alternate cluster or cloud), and replication constraints such as bandwidth and schedule. Particular embodiments may take lightweight snapshots and transfer the delta of the snapshots for the given volume groups. Along with file-services share data, particular embodiments may also transfer the VFS configuration e.g. file-server size, compute-unit configuration, and metadata, e.g., share ACLs, quotas, and so on. Particular embodiments may also provide a simplified user interface to configure mapping of network, DNS-servers, active-directory, etc. between remote sites. Potential benefits may include:

1. Granular level of protection (share or group of shares) to configure different Recovery Point Objective.
2. Custom replication policies to utilize the network resources effectively for replication.
3. Fine control on network and ecosystem resource mapping between sites.
4. Light weight snapshot includes share data delta, metadata and file-server configuration leading to less replication traffic across sites.
5. One click restore of file-services on remote site.
6. Distribution of share replication across multiple remote sites.
7. Multiple recovery points on multiple remote sites for multi-site failures.

Examples described herein provide systems and methods for joining a domain from a file server when an end user doesn't want to provide active directory credentials (e.g., active directory administrator credentials) to the server. Instead, a domain administrator can get a list of entities to create on the active directory and delegate a regular user to complete the join-domain process. The file server uses the regular user's credentials to verify all the entities and marks the join-domain process as successful or failed depending on the verification outcome. This may address a concern of a domain administrator about exposing credentials to a third party file server in some examples.

Figure 6:
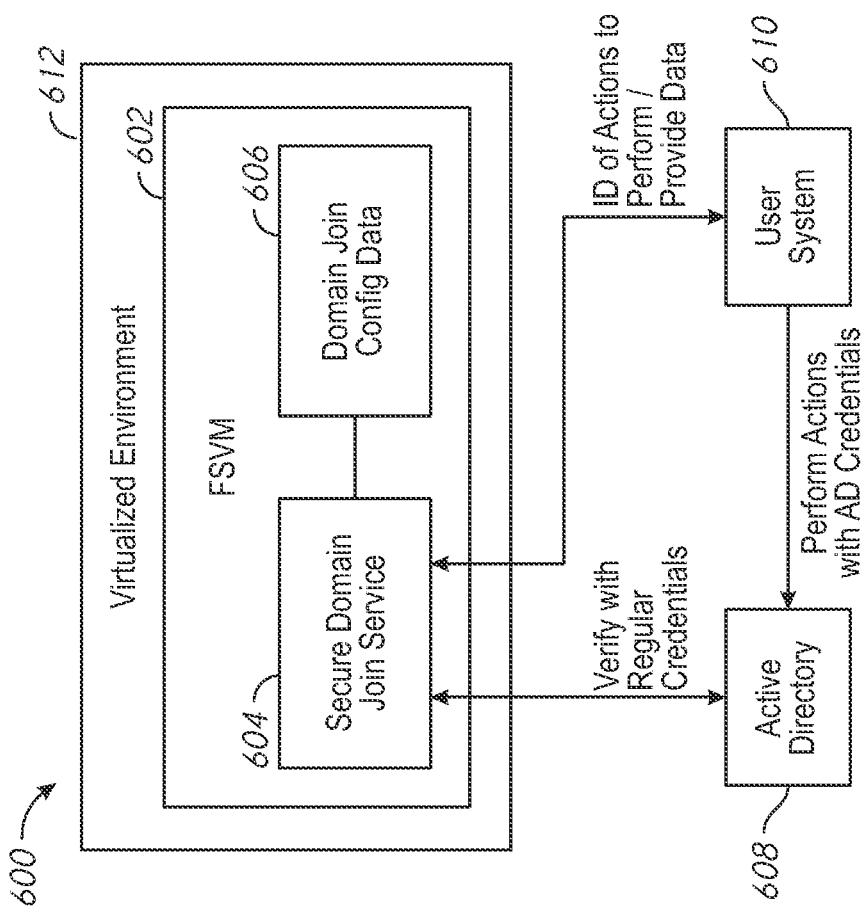
FIG. 6 is a schematic illustration of a system arranged in accordance with examples described herein.

FIG. 6 is a schematic illustration of a system arranged in accordance with examples described herein. The system 600 includes virtualized environment 612, which may include FSVM 602, which itself may include secure domain join service 604 and domain join config data 606. The system 600 may include active directory 608, and user system 610. The active directory 608 and user system 610 may be in communication with one another and with the secure domain join service 604 (e.g., with the FSVM 602).

The system 600 includes a virtualized environment 612. The virtualized environment 612 may be implemented, for example, using any virtualized environment described herein, such as that described with reference to FIG. 1A, FIG. 1B, FIG. 2A, and/or FIG. 2B. The virtualized environment 612 may include any number of computing nodes, and may include a virtualized file server, such as the virtualized file server 202 described with reference to FIG. 2A and FIG. 2B. The virtualized file server may include any number of file server virtual machines (FSVMs), with FSVM 602 shown in FIG. 6 as an exemplary FSVM. Recall FSVM 602 may file conduct input/output (I/O) transactions with a storage pool shared by the distributed file server of the virtualized environment 612. The virtualized environment 612 (which may also be referred to as a virtualization environment) may implemented by a plurality of host machines (e.g., nodes). Each of the host machines may include a hypervisor, and may host one or more user virtual machines and/or controller virtual machines. In some examples, at least one FSVM may run on each one of the host machines.

Examples of FSVMs may host a secure domain join service, such as secure domain join service 604 of FIG. 6. In some examples, multiple FSVMs in a virtualized environment (e.g., in a cluster) may host secure domain join services. In some examples, each FSVM in the virtualized environment may host a secure domain join service. In some examples, a single secure domain join service may service multiple FSVMs in the virtualized environment.

Secure domain join services may have access to domain join configuration data, such as domain join config data 606 shown in FIG. 6. The domain join config data 606 may be stored, for example, in local memory of the FSVM 602. In other examples, the domain join config data 606 may be stored in other locations, such as in a storage pool of the virtualized environment 612. The domain join config data 606 may include configuration information used in conducting a domain join process—including, but not limited to.

The system 600 may include user system 610. The user system 610 may be implemented using a computing system (e.g., a processor and memory encoded with executable instructions for performing the user system functions described herein). The user system 610 may be in communication with virtualized environment 612, e.g., in communication with FSVM 602. In some examples, the user system 610 may be in communication with a single cluster, while in other examples, the user system 610 may be in communication with multiple clusters. Communication between the user system 610 and the virtualized environment 612 may occur, for example, over a network.

Note that, in some examples, the virtualized environment 612 may be provided by an entity different than an entity in control of user system 610. For example, the virtualized environment 612 may be maintained and/or operated by an enterprise cloud or other provider. The user system 610 may be maintained and/or operated by a user (e.g., an IT administrator or enterprise). The enterprise maintaining and/or operating the user system 610 may be associated with one or more user VMs which may be running in the virtualized environment 612.

The system 600 may include an active directory, such as active directory 608. The active directory 608 may be implemented using any of a variety of active directories, including MICROSOFT ACTIVE DIRECTORY. The active directory 608 may be hosted by a computing system, and/or may be referred to as a domain controller in some examples. The active directory 608 may function to authenticate and/or authorize users and processes in a domain. The active directory 608 may assign and enforcing security policies for computing nodes in a domain and may install and/or updating software. Other services may additionally or instead be provided by active directory 608.

It may be desirable for one or more FSVMs to join a domain. For example, it may be desirable for FSVM 602 to join a domain managed by active directory 608. Generally, the active directory 608 may include an arrangement of information about objects. The objects may include resources (e.g., peripherals, components, nodes) and principals (e.g., users and/or accounts). Objects may include an identification of the object and attributes of the object and may be arranged in a schema. In some examples, the schema arrangement may be particular to an individual or type of active directory used. Generally, objects are grouped into domains. The objects for a single domain may be stored in a single database. In some examples, domains may be identified by their DNS name structure, e.g., the namespace. In this manner, a domain may refer to a logical group of network objects (e.g., nodes, users, devices) that share the same active directory database.

Joining a domain accordingly may involve writing new objects to the active directory 608. Writing to active directory 608 may utilize a certain level of security permissions. It may be desirable to limit access to active directory 608, for example, given the nature of the services provided by the active directory 608, it may create a higher risk if access to the active directory 608 were compromised. Accordingly, it may not be desirable to share too widely the access credentials for write privileged to the active directory 608.

Accordingly, to domain join an FSVM described herein, such as FSVM 602, objects may be written in the active directory 608, corresponding to the FSVM. However, recall that the virtualized environment 612, including FSVM 602, may be operated by an entity that may not operate active directory 608 and/or user system 610. It may be undesirable to provide access to credentials to FSVM 602 which allow for write access to the active directory 608. Accordingly, secure domain join services are provided which may allow for FSVMs to be domain joined without the FSVM itself having access to write credentials for the active directory (e.g., for the domain controller).

Examples described herein may request a distributed file server, including a group or cluster of file server virtual machines, join an active directory domain. For example, during operation, the user system 610 and/or the active directory 608 and/or the FSVM 602 itself may provide a request to domain join the FSVM 602. For example, a request may be provided to domain join a virtualized file server including FSVM 602. The request may be provided during setup in some examples, during normal operation in some examples, and/or during failover or recovery in some examples.

The secure domain join service 604 may, responsive to the request, identify actions to perform to facilitate the domain join but that may utilize active directory credentials, which may also be referred to as active director administrator credentials. In some examples, the identification of actions to perform may be provided using domain join configuration data stored by the FSVM (e.g., domain join config data 606). The active directory credentials may, for example, be access credentials for accessing the active directory 608. In some examples, the active directory credentials may be credentials sufficient to provide write access to the active directory 608. In some examples, the secure domain join service 604 may generate the list of actions to be performed based on communication with and/or stored information about active directory 608. In some examples, the identification of actions to perform may be specific to the active directory 608. For example, the active directory 608 may include particular schemas or other arrangements of data, and the identified actions to perform may include requesting data in a particular format e.g., schema) or frequency used by the active directory 608.

An identification of the actions to be performed using the active directory credentials may be provided to the user system 610. The user system 610 may receive the actions to be performed using the active directory credentials. The identification may include, for example, a list. The identification of actions may include, for example, an identification of entities (e.g., objects) to create on (e.g., add to) the active directory 608. Examples of entities include, but are not limited to, account name, account attributes, nameserver entries, service principal names (SPN), domain name server (DNS) entries, or combinations thereof. Responsive to receipt of identification of the actions to be performed, the user system 610 may perform the actions utilizing the active directory credentials. For example, the user system 610 may access the active directory 608 and write one or more objects, including attributes of the objects, pertaining to the FSVM 602 and/or the virtualized file server including the FSVM 602.

The secure domain join service 604 may perform (e.g., initiate) a domain join process and may verify completion of the domain join process using regular credentials. Verification may not require the active directory credentials. For example, the regular credentials (e.g., credentials which provide for read access to active directory 608) may be used to verify the list of actions was completed and the domain join process completed. The regular credentials may be different than the active directory credentials. For example, the active directory credentials may have sufficient permission to create entities on the active directory domain (e.g., write access). The regular credentials may have insufficient permission to create entities on the active directory domain (e.g., read-only access). In some examples, the verification may be provided using domain join configuration data stored by the file server virtual machine. The verification may be performed by accessing the active directory 608 to confirm, for example, that the requested entities were created. The verification may be performed in some examples by accessing a DNS server to confirm, for example, that the requested DNS entries were written.

Results of the verification may be provided, for example, to user system 610. The result may be displayed (e.g., "domain join verified") or other display indication of successful join.

In this manner, one or more FSVMs may be perform a domain join process to join the FSVM to a domain without making active directory credentials accessible to the FSVM and/or to a provider of the FSVM.

Figure 7:
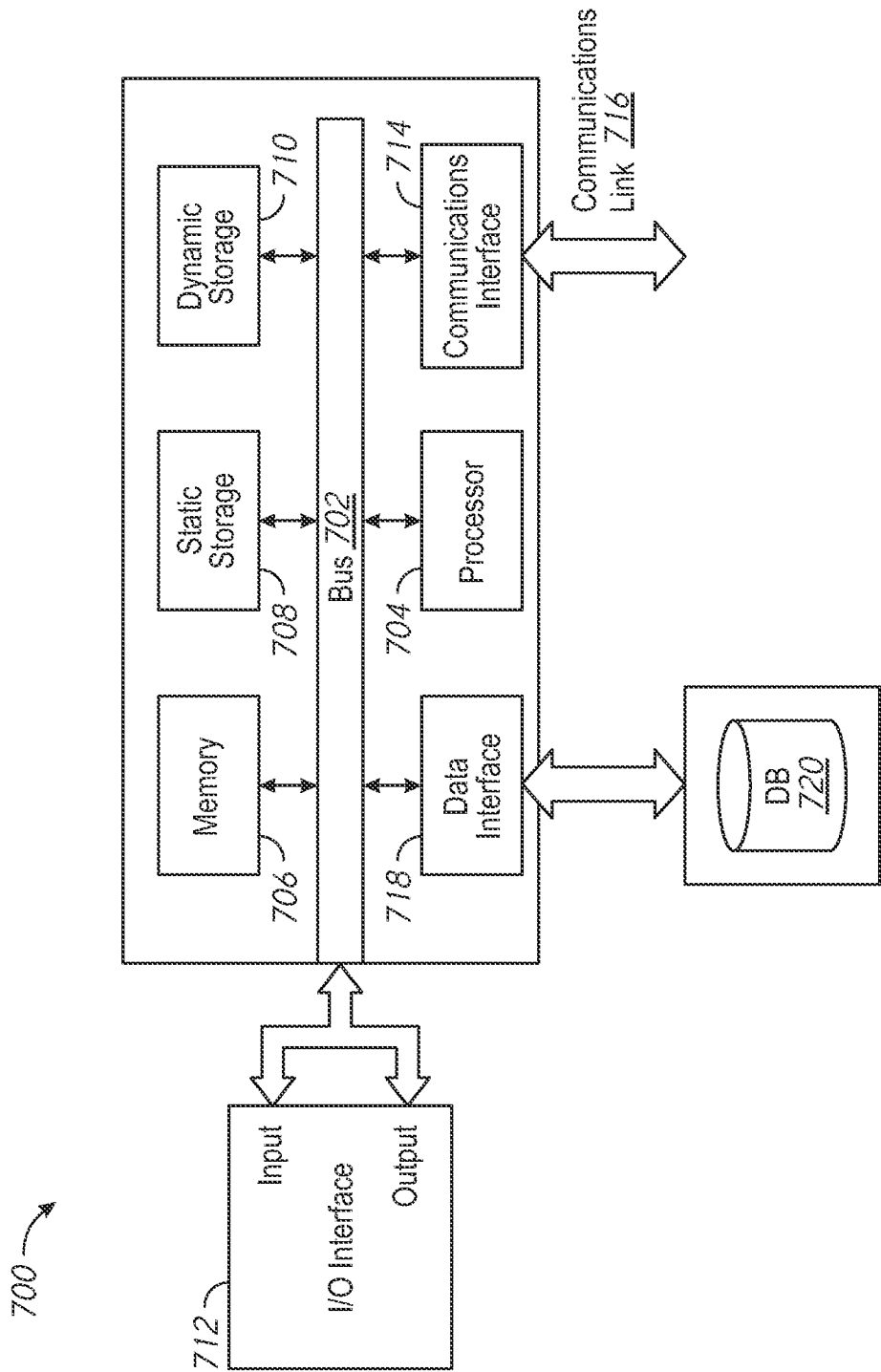
FIG. 7 is a block diagram of an illustrative computing system 700 suitable for implementing particular embodiments.

FIG. 7 is a block diagram of an illustrative computing system 700 suitable for implementing particular embodiments. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

Computer system 700 includes a bus 702 (e.g., an address bus and a data bus) or other communication mechanism for communicating information, which interconnects subsystems and devices, such as processor 704, memory 706 (e.g., RAM), static storage 708 (e.g., ROM), dynamic storage 710 (e.g., magnetic or optical), communication interface 714 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 712 (e.g., keyboard, keypad, mouse, microphone). In particular embodiments, computer system 700 may include one or more of any such components.

In particular embodiments, processor 704 includes hardware for executing instructions, such as those making up a computer program. As an example and not by way of limitation, to execute instructions, processor 704 may retrieve (or fetch) the instructions from an internal register, an internal cache, memory 706, static storage 708, or dynamic storage 710; decode and execute them; and then write one or more results to an internal register, an internal cache, memory 706, static storage 708, or dynamic storage 710. In particular embodiments, processor 704 may include one or more internal caches for data, instructions, or addresses. This disclosure contemplates processor 704 including any suitable number of any suitable internal caches, where appropriate. As an example and not by way of limitation, processor 704 may include one or more instruction caches, one or more data caches, and one or more translation lookaside buffers (TLBs). Instructions in the instruction caches may be copies of instructions in memory 706, static storage 708, or dynamic storage 710, and the instruction caches may speed up retrieval of those instructions by processor 704. Data in the data caches may be copies of data in memory 706, static storage 708, or dynamic storage 710 for instructions executing at processor 704 to operate on; the results of previous instructions executed at processor 704 for access by subsequent instructions executing at processor 704 or for writing to memory 706, static storage 708, or dynamic storage 710; or other suitable data. The data caches may speed up read or write operations by processor 704. The TLBs may speed up virtual-address translation for processor 704. In particular embodiments, processor 704 may include one or more internal registers for data, instructions, or addresses. This disclosure contemplates processor 704 including any suitable number of any suitable internal registers, where appropriate. Where appropriate, processor 704 may include one or more arithmetic logic units (ALUs); be a multi-core processor; or include one or more processors 702. Although this disclosure describes and illustrates a particular processor, this disclosure contemplates any suitable processor.

In particular embodiments, I/O interface 712 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 712 for them. Where appropriate, I/O interface 712 may include one or more device or software drivers enabling processor 704 to drive one or more of these I/O devices. I/O interface 712 may include one or more I/O interfaces 712, where appropriate. Although this disclosure describes and illustrates a particular I/O interface, this disclosure contemplates any suitable I/O interface.

In particular embodiments, communication interface 714 includes hardware, software, or both providing one or more interfaces for communication (such as, for example, packet-based communication) between computer system 700 and one or more other computer systems 700 or one or more networks. As an example and not by way of limitation, communication interface 714 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 714 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 714 for any of these networks, where appropriate. Communication interface 714 may include one or more communication interfaces 714, where appropriate. Although this disclosure describes and illustrates a particular communication interface, this disclosure contemplates any suitable communication interface.

One or more memory buses (which may each include an address bus and a data bus) may couple processor 704 to memory 706. Bus 702 may include one or more memory buses, as described below. In particular embodiments, one or more memory management units (MMUs) reside between processor 704 and memory 706 and facilitate accesses to memory 706 requested by processor 704. In particular embodiments, memory 706 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 706 may include one or more memories 706, where appropriate. Although this disclosure describes and illustrates particular memory, this disclosure contemplates any suitable memory.

Where appropriate, the ROM may be mask-programmed ROM, programmable ROM (PROM), erasable PROM (EPROM), electrically erasable PROM (EEPROM), electrically alterable ROM (EAROM), or flash memory or a combination of two or more of these. In particular embodiments, dynamic storage 710 may include a hard disk drive (HDD), a floppy disk drive, flash memory, an optical disc, a magneto-optical disc, magnetic tape, or a Universal Serial Bus (USB) drive or a combination of two or more of these. Dynamic storage 710 may include removable or non-removable (or fixed) media, where appropriate. Dynamic storage 710 may be internal or external to computer system 700, where appropriate. This disclosure contemplates mass dynamic storage 710 taking any suitable physical form. Dynamic storage 710 may include one or more storage control units facilitating communication between processor 704 and dynamic storage 710, where appropriate.

In particular embodiments, bus 702 includes hardware, software, or both coupling components of computer system 700 to each other. As an example and not by way of limitation, bus 702 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 702 may include one or more buses 706, where appropriate. Although this disclosure describes and illustrates a particular bus, this disclosure contemplates any suitable bus or interconnect.

According to particular embodiments, computer system 700 performs specific operations by processor 704 executing one or more sequences of one or more instructions contained in memory 706. Such instructions may be read into memory 706 from another computer readable/usable medium, such as static storage 708 or dynamic storage 710. In alternative embodiments, hard-wired circuitry may be used in place of or in combination with software instructions. Thus, particular embodiments are not limited to any specific combination of hardware circuitry and/or software. In one embodiment, the term "logic" shall mean any combination of software or hardware that is used to implement all or part of particular embodiments disclosed herein.

The term "computer readable medium" or "computer usable medium" as used herein refers to any medium that participates in providing instructions to processor 704 for execution. Such a medium may take many forms, including but not limited to, nonvolatile media and volatile media. Non-volatile media includes, for example, optical or magnetic disks, such as static storage 708 or dynamic storage 710. Volatile media includes dynamic memory, such as memory 706.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In particular embodiments, execution of the sequences of instructions is performed by a single computer system 700. According to other particular embodiments, two or more computer systems 700 coupled by communication link 716 (e.g., LAN, PTSN, or wireless network) may perform the sequence of instructions in coordination with one another.

Computer system 700 may transmit and receive messages, data, and instructions, including program, i.e., application code, through communication link 716 and communication interface 714. Received program code may be executed by processor 704 as it is received, and/or stored in static storage 708 or dynamic storage 710, or other non-volatile storage for later execution. A database 720 may be used to store data accessible by the system 700 by way of data interface 718.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAT cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   requesting a distributed file server including a file server virtual machines (FSVM) join an active directory domain, wherein the file server virtual machine is configured to conduct input/output (I/O) transactions with a storage pool shared by the distributed file server;
   receiving an identification of an action to perform using active directory credentials;
   performing the actions using the active directory credentials;
   initiating a domain join process using regular credentials, wherein the regular credentials are different than the active directory credentials; and
   receiving verification of completion of the domain join process including the actions using the regular credentials.

2. The method of claim 1, wherein the identification of the action to perform comprises identification of entities to create on an active directory.

3. The method of claim 2, wherein the entities to create comprise account name, account attribute, name server entry, or combinations thereof.

4. The method of claim 1, wherein the identification of the action to perform is specific to the active directory domain.

5. The method of claim 1, wherein the domain join process is performed without access to the active directory credentials.

6. The method of claim 1, wherein the active directory credentials have sufficient permission to create entities on the active directory domain.

7. The method of claim 1, wherein the identification of the action to perform is provided using domain join configuration data stored by the distributed file server.

8. The method of claim 1, wherein the verification is performed by the distributed file server using active directory and name server configuration data.

9. The method of claim 1, wherein the regular credentials have insufficient permission to create entities on the active directory domain.

10. A system comprising:
    at least one processor;
    computer readable media encoded with instructions which, when executed, cause the system to perform actions comprising:
      request a distributed file server including a file server virtual machine (FSVM) join an active directory domain, wherein the file server virtual machine is configured to conduct input/output (I/O) transactions with a storage pool shared by the distributed file server;
      receive an identification of an action to perform using active directory credentials;
      perform the action using the active directory credentials;
      initiate a domain join process using regular credentials, wherein the regular credentials are different from the active directory credentials; and
      receive verification of completion of the domain join process including the action using the regular credentials.

11. The system of claim 10, wherein the active directory credentials associated with permissions different from the regular credentials.

12. The system of claim 10, wherein the active directory credentials are sufficient for write access to the active directory.

13. The system of claim 10, wherein the action to perform includes a list of entities to create on the active directory.

14. The systems of claim 13, wherein the entities to create comprise account name, account attribute, nameserver entry, or combinations thereof.

15. The system of claim 10, wherein the identification of the action to perform is specific to the active directory domain.

16. The system of claim 10, wherein the regular credentials have insufficient permission to create entities on the active directory domain.

17. At least one non-transitory computer readable medium encoded with instructions which, when executed, cause a system to perform action comprising:
   request a distributed file server including a file server virtual machine (FSVM), to join an active directory domain, wherein the file server virtual machine is configured to conduct input/output (I/O) transactions with a storage pool shared by the distributed file server;
   receive an identification of an action to perform using active directory credentials;
   perform, using the active directory credentials, the action;
   initiate, at the active directory, a domain join process using regular credentials, wherein the regular credentials are different from the active directory credentials; and
   receive, at the active directory, verification of completion of the domain join process including the action using the regular credentials.

18. The non-transitory computer readable medium of claim 17, wherein the domain join process is configured to verify completion of the domain join process including completion of the action to perform.

19. The non-transitory computer readable medium of claim 17, wherein the action to perform includes a list of entities to create on the active directory.

20. The non-transitory computer readable medium of claim 17, wherein the active directory; credentials are sufficient for write access to the active directory.

21. The non-transitory computer readable medium of claim 17, wherein the active directory credentials are associated with permissions different from the regular credentials.

22. The non-transitory computer readable medium of claim 17, wherein the regular credentials have insufficient permission to create entities on the active directory domain.

* * * * *

UNITED STATES PATENT AND TRADEMARK OFFICE
CERTIFICATE OF CORRECTION

PATENT NO. : 11,675,746 B2
APPLICATION NO. : 17/364453
DATED : June 13, 2023
INVENTOR(S) : Hemantha Kumar Thummala et al.

Page 1 of 1

It is certified that error appears in the above-identified patent and that said Letters Patent is hereby corrected as shown below:

In the Claims

Column 36:
Line 7, change "machines" to --machine--.

Column 37:
Line 2, change "credentials associated" to --credentials are associated--.
Line 20, change "action" to --actions--.

Signed and Sealed this
Twenty-seventh Day of February, 2024

Katherine Kelly Vidal
*Director of the United States Patent and Trademark Office*